US012659182B2

(12) United States Patent (10) Patent No.: US 12,659,182 B2
Liu et al. (45) Date of Patent: Jun. 16, 2026

(54) CONSENSUS METHOD, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventors: Kemeng Liu, Shenzhen (CN); Zhuguang Shao, Shenzhen (CN); Neng Wang, Shenzhen (CN); Dan Xu, Shenzhen (CN); Kun Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 18/652,349

(22) Filed: May 1, 2024

(65) Prior Publication Data

US 2024/0291680 A1 Aug. 29, 2024

Related U.S. Application Data

(63) Continuation of application No. PCT/CN2023/087968, filed on Apr. 13, 2023.

(30) Foreign Application Priority Data

Jul. 8, 2022 (CN) .......................... 202210800153.9

(51) Int. Cl.
*H04L 9/00* (2022.01)
(52) U.S. Cl.
CPC .......... *H04L 9/50* (2022.05); *H04L 2209/463* (2013.01)

(58) Field of Classification Search
CPC ............................ H04L 9/50; H04L 2209/463
See application file for complete search history.

(56) References Cited

U.S. PATENT DOCUMENTS

2019/0394267 A1* 12/2019 Bistram ................ H04L 67/108
2020/0134578 A1 4/2020 Shi et al.
(Continued)

FOREIGN PATENT DOCUMENTS

| CN | 106445711 A | 2/2017 |
| CN | 108182635 A | 6/2018 |
| CN | 113347007 A | 9/2021 |

OTHER PUBLICATIONS

The World Intellectual Property Organization (WIPO) International Search Report for PCT/CN2023/087968 Aug. 3, 2023 5 Pages (including translation).

*Primary Examiner* — Viet D Vu
(74) *Attorney, Agent, or Firm* — Anova Law Group, PLLC

(57) ABSTRACT

A consensus method for a blockchain includes: obtaining, in a consensus reaching process of a block initiated by a proposal node, prevote messages generated by consensus nodes in a blockchain network; counting a quantity of first prevote messages for the block based on the received prevote messages, the first prevote messages being generated by the consensus nodes within a set duration in response to a proposal message for the block, the set duration corresponding to the proposal node and being determined based on a block generation duration of the proposal node; and adjusting the set duration corresponding to the proposal node recorded by the consensus nodes based on the quantity of the first prevote messages.

18 Claims, 8 Drawing Sheets

(56) References Cited

U.S. PATENT DOCUMENTS

| | | | |
|---|---|---|---|
| 2021/0026745 A1* | 1/2021 | Wang ..................... | G06F 11/183 |
| 2021/0297238 A1* | 9/2021 | Guo ........................ | H04L 12/18 |
| 2022/0366088 A1* | 11/2022 | Grover .................... | G06F 21/64 |

* cited by examiner

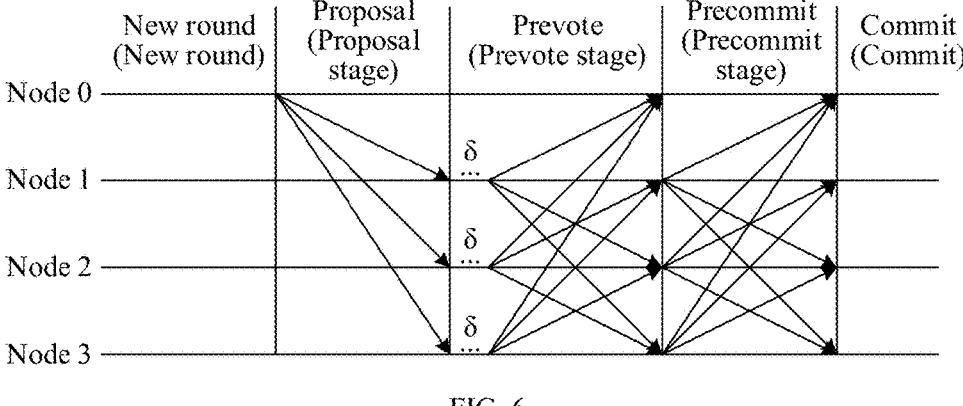

FIG. 6

| Obtain, in a consensus reaching process of a block  initiated by a proposal node, prevote messages generated by consensus nodes in a blockchain network | S710 |

| Count a quantity of first prevote messages for the block based on the obtained prevote messages, the first prevote messages being generated by the consensus nodes within a set duration in response to a proposal message for the block, the set duration corresponding to the proposal node and being determined based on a block generation duration of the proposal node | S720 |

| Adjust the set duration corresponding to the proposal node recorded by the consensus nodes based on the quantity of the first prevote messages | S730 |

FIG. 7

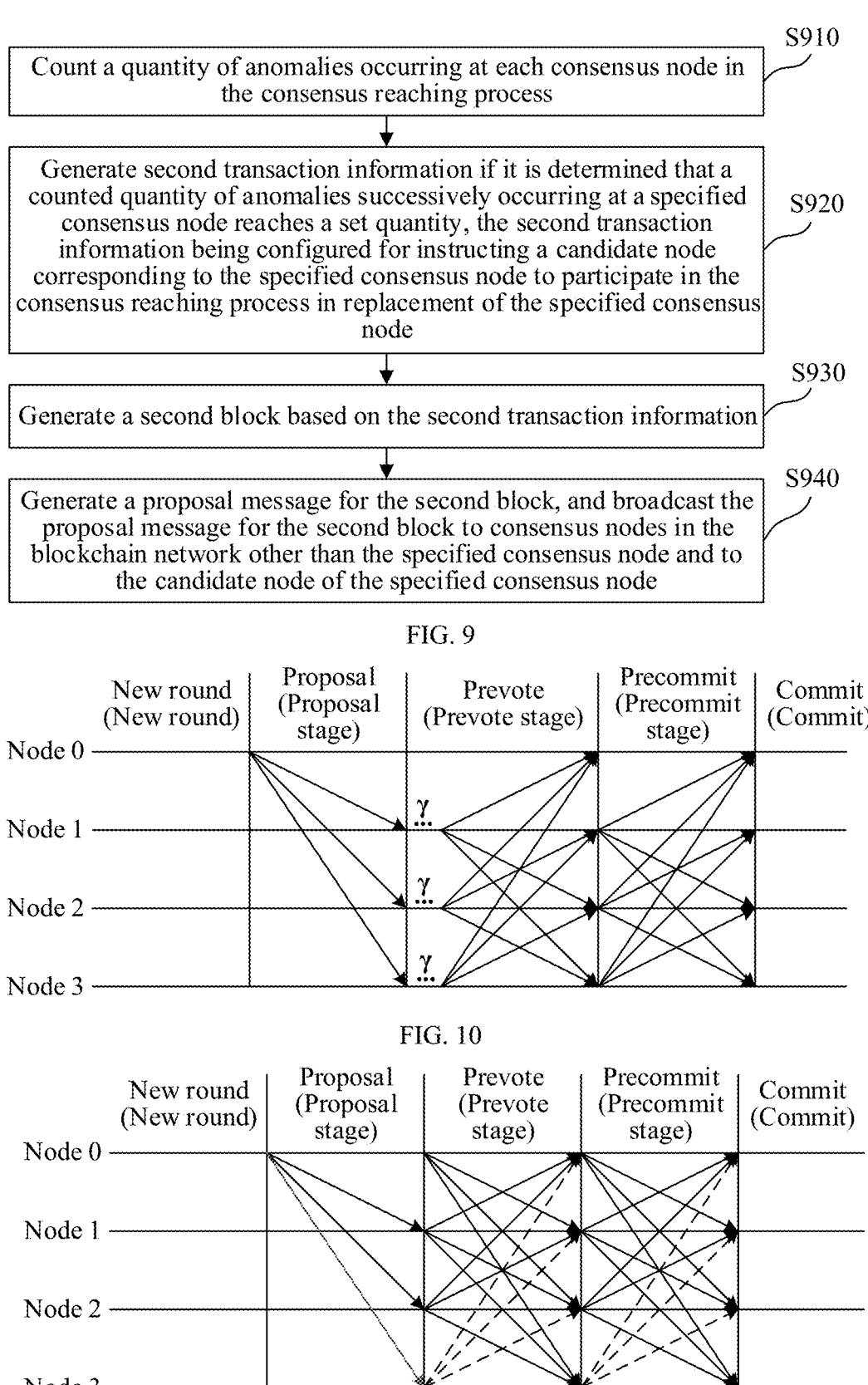

S910

Count a quantity of anomalies occurring at each consensus node in the consensus reaching process

S920

Generate second transaction information if it is determined that a counted quantity of anomalies successively occurring at a specified consensus node reaches a set quantity, the second transaction information being configured for instructing a candidate node corresponding to the specified consensus node to participate in the consensus reaching process in replacement of the specified consensus node

S930

Generate a second block based on the second transaction information

S940

Generate a proposal message for the second block, and broadcast the proposal message for the second block to consensus nodes in the blockchain network other than the specified consensus node and to the candidate node of the specified consensus node

CONSENSUS METHOD, COMPUTER-READABLE MEDIUM, AND ELECTRONIC DEVICE

CROSS-REFERENCES TO RELATED APPLICATIONS

This application is a continuation application of PCT Patent Application No. PCT/CN2023/087968, filed on Apr. 13, 2023, which claims priority to Chinese Patent Application No. 202210800153.9, filed on Jul. 8, 2022, all of which is incorporated by reference herein in their entirety.

FIELD OF THE TECHNOLOGY

The present disclosure relates to the field of computers and communication technologies and, in particular, to a consensus technology for a blockchain.

BACKGROUND OF THE DISCLOSURE

In blockchain technologies, a consensus mechanism is a foundation for normal operation of a blockchain system. Each node device in the blockchain system has a distributed ledger (that is, a blockchain) stored therein. Through a consensus reaching process of the blockchain system, the distributed ledgers of the node devices are maintained to be consistent with one another. A Byzantine fault tolerance (BFT) consensus algorithm is a frequently-used consensus algorithm in the blockchain technologies. In this consensus algorithm, each block needs to go through three stages: proposal, prevote, and precommit. If a proposal node fails, a verification node has to wait for a fixed time before reaching the prevote stage. Consequently, a consensus reaching process consumes an overly long time, and consensus performance of the blockchain is affected.

SUMMARY

One aspect of the present disclosure provides a consensus method for a blockchain, performed by an electronic device. The method include obtaining, in a consensus reaching process of a block initiated by a proposal node, prevote messages generated by consensus nodes in a blockchain network; counting a quantity of first prevote messages for the block based on the obtained prevote messages, the first prevote messages being generated by the consensus nodes within a set duration in response to a proposal message for the block, the set duration corresponding to the proposal node and being determined based on a block generation duration of the proposal node; and adjusting the set duration corresponding to the proposal node recorded by the consensus nodes based on the quantity of the first prevote messages.

Another aspect of the present disclosure provides an electronic device. The electronic device includes one or more processors; and a memory, configured to store one or more computer programs that, when being executed, cause the one or more processors to implement a consensus method for a blockchain by performing: obtaining, in a consensus reaching process of a block initiated by a proposal node, prevote messages generated by consensus nodes in a blockchain network; counting a quantity of first prevote messages for the block based on the obtained prevote messages, the first prevote messages being generated by the consensus nodes within a set duration in response to a proposal message for the block, the set duration corresponding to the proposal node and being determined based on a block generation duration of the proposal node; and adjusting the set duration corresponding to the proposal node recorded by the consensus nodes based on the quantity of the first prevote messages.

Another aspect of the present disclosure provides a non-transitory computer-readable medium containing a computer program that, when being executed, causes one or more processors to implement a consensus method for a blockchain by performing: obtaining, in a consensus reaching process of a block initiated by a proposal node, prevote messages generated by consensus nodes in a blockchain network; counting a quantity of first prevote messages for the block based on the obtained prevote messages, the first prevote messages being generated by the consensus nodes within a set duration in response to a proposal message for the block, the set duration corresponding to the proposal node and being determined based on a block generation duration of the proposal node; and adjusting the set duration corresponding to the proposal node recorded by the consensus nodes based on the quantity of the first prevote messages.

BRIEF DESCRIPTION OF THE DRAWINGS

FIG. 6 is a schematic flowchart of a consensus algorithm.

FIG. 7 is a flowchart of a consensus method for a blockchain according to an embodiment of the present disclosure.

FIG. 9 is a flowchart of a consensus method for a blockchain according to an embodiment of the present disclosure.

FIG. 10 is a schematic flowchart of a consensus algorithm according to an embodiment of the present disclosure.

FIG. 11 is a schematic flowchart of a consensus algorithm according to an embodiment of the present disclosure.

DESCRIPTION OF EMBODIMENTS

Various embodiments of the present disclosure involve a blockchain technology. Specifically, a blockchain is a new application mode of computer technologies such as distributed data storage, point-to-point transmission, a consensus mechanism, and an encryption algorithm. The blockchain, in essence, is a decentralized database, and includes a series of data blocks (that is, blocks) generated through a cryptographic method. Each of the data blocks includes information about a batch of network transactions, which is subject to effectiveness verification (anti-counterfeiting) and is configured for generating a next block. The blockchain may include an underlying blockchain platform, a platform product service layer, and an application service layer.

As described above, the blockchain, in essence, is a decentralized database, and the blockchain is jointly maintained by nodes in a blockchain network. For example, a blockchain network shown in FIG. 1 may include a plurality of nodes 101. The plurality of nodes 101 may be clients that form the blockchain network. During normal operation, each node 101 may receive input information, and maintain shared data within the blockchain network based on the received input information. To ensure information exchange within the blockchain network, information connections may exist among the nodes in the blockchain network. Information may be transmitted among the nodes through the information connections. For example, when any node in the blockchain network receives input information, other nodes in the blockchain network obtain the input information based on a consensus algorithm, and store the input information as the shared data, so that data stored on all nodes in the blockchain network is consistent.

Each node in the blockchain network has a corresponding node identifier, and each node in the blockchain network can store the node identities of the other nodes, so that a generated block can be subsequently broadcast to the other nodes in the blockchain network based on the node identities of the other nodes. A node identifier list may be maintained in each node. A node name and the node identifier are stored in the corresponding node identifier list. The node identifier may be an Internet protocol (IP) address and any other type of information that can be configured for identifying the node.

Figures 1, 2, 3:
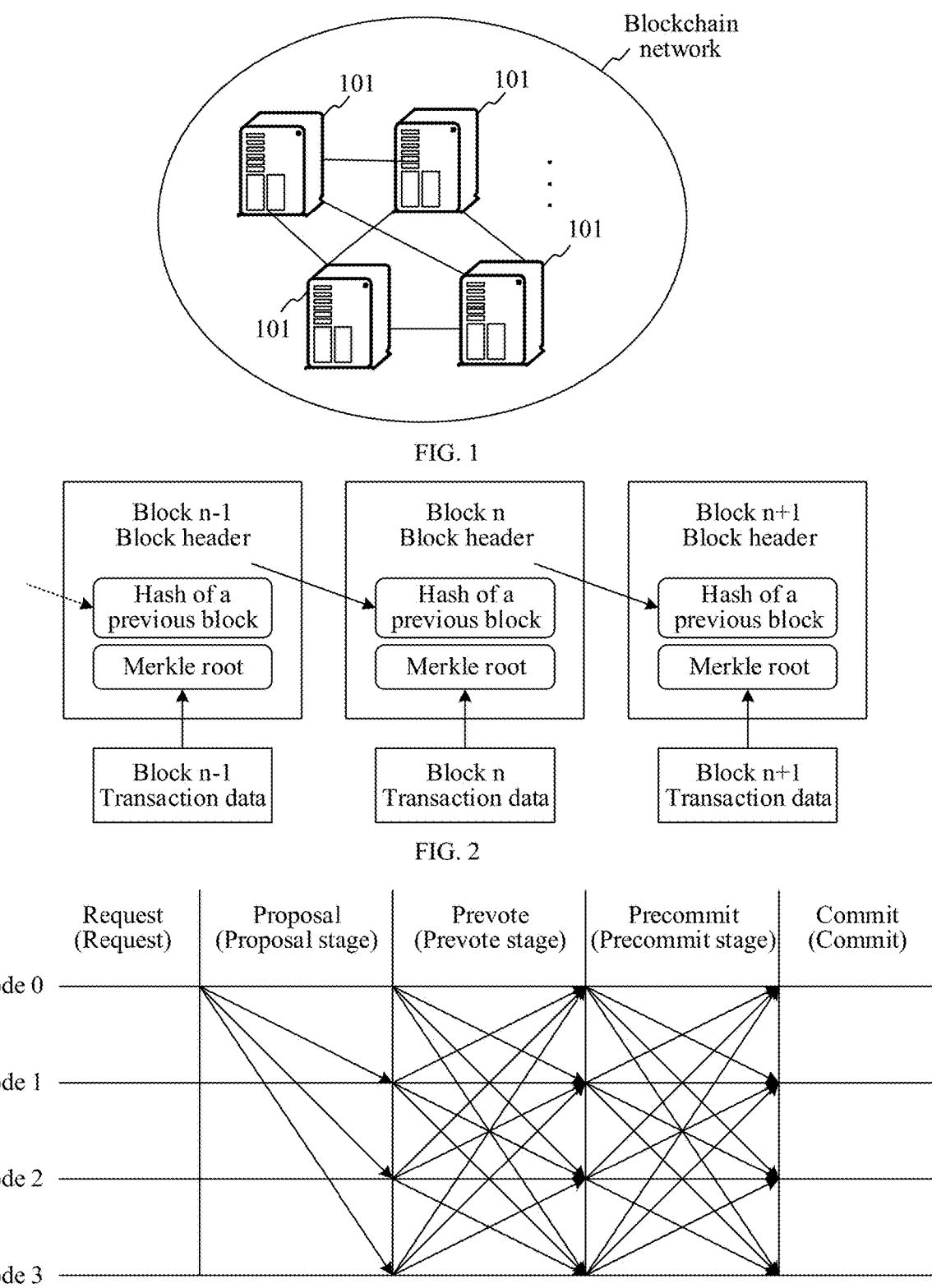
FIG. 1 is a schematic structural diagram of a blockchain network.
FIG. 2 is a schematic diagram of a connection relationship between blocks in a blockchain.
FIG. 3 is a schematic flowchart of a consensus algorithm.

Each node in the blockchain network has a same blockchain stored therein. A blockchain is composed of a plurality of blocks. As shown in FIG. 2, a blockchain is composed of a plurality of blocks. These blocks are connected in a chain structure in ascending order of creation timestamps. Each block includes a block header and a block body. The block header has a hash of a previous block and a Merkle root of a current block stored therein. The block body includes complete transaction data of the current block, which is organized together in a form of a Merkle tree. It may be learned from the structure of the blockchain that, block data stored in each block in the blockchain is associated with block data stored in a parent block (that is, the previous block), which ensures security of input information in the block.

Each node in the blockchain network may be a server, or may be a terminal device. The server may be an independent physical server, a server cluster composed of a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a content delivery network (CDN), a big data platform, and an artificial intelligence platform. The terminal device may be a smartphone, a tablet computer, a notebook computer, a desktop computer, a smart speaker, a smartwatch, smart home, an on-board terminal, an aircraft, or the like, but is not limited thereto. The nodes may be directly or indirectly connected through wired or wireless communication, which is not limited in the present disclosure.

The Merkle tree is an important part of the blockchain technology. The blockchain does not directly store raw data in plain text. A hash operation needs to be performed on the raw data, and the raw data is stored as hash values. The Merkle tree is configured to organize the hash values formed by a plurality of pieces of raw data after the hash operation based on a binary tree structure, and store the hash values in the block body of the block.

The blockchain technology further includes a key technology, that is, a consensus mechanism. The consensus mechanism is a foundation for normal operation of a blockchain system. The so-called consensus means coming to an agreement. Each node device in the blockchain system has a distributed ledger (that is, a blockchain) stored therein. Through a consensus reaching process of the blockchain system, the distributed ledgers of the node devices are maintained to be consistent. All or some of the node devices in the blockchain system may participate in a consensus reaching process of the blockchain system. The consensus reaching process of the blockchain systems is usually realized based on a consensus algorithm. Each node device that participates in the consensus reaching performs a corresponding procedure of the consensus reaching process by running the consensus algorithm. Examplary consensus algorithms may include a proof of work (PoW), a proof of stake (PoS), a delegated proof of stake (DPoS), a Byzantine fault tolerance (BFT), a practical Byzantine fault tolerance (PBFT), a tendermint BFT (TBFT), and the like.

Generally, one or more rounds of consensus reaching processes need to be performed at a block height of the blockchain to reach an agreement among the node devices that participate in the consensus reaching. The nodes that participate in the consensus reaching are referred to as consensus nodes. The consensus nodes ensure data consistency of the entire blockchain system through a specific consensus algorithm. The consensus nodes of the blockchain include a proposal node and a verification node. The proposal node is responsible for proposing blocks. The verification node needs to verify the blocks proposed by the proposal node based on the corresponding consensus algorithm, to ensure that the blocks proposed by the proposal node are correct and effective.

The block height is configured for representing a quantity of blocks connected to the blockchain. The block height is an identifier of a block, and may be configured for indicating a position of the block in the blockchain. For example, a block height of a genesis block in the blockchain is 0 by default, a block height of a first block after the genesis block is 1 (the first block may be referred to as a block 1 for short), a block height of a second block after the genesis block is 2 (the second block may be referred to as a block 2 for short), and so on.

For example, if a current block of the blockchain has a block height of 300 (which is referred to as a block 300 for short), it means that 300 blocks are stacked on the genesis block. In other words, a quantity of blocks on the blockchain starting from the genesis block to the block 300 is 301. The consensus reaching process performed at a block height of the blockchain is a process of reaching a consensus on a to-be-uploaded block in the blockchain system when the blockchain is at the block height. If a consensus is successfully reached on the to-be-uploaded block, the block is added to the blockchain, and the block height of the blockchain is increased by 1. For example, the consensus reaching process performed at a block height of 10 of the blockchain is a process of reaching a consensus on a to-be-chained block in the blockchain system when the blockchain is at the block height of 10. If a consensus is successfully reached on the block, the block is added to the blockchain, and the block height of the blockchain changes from 10 to 11.

In general, as shown in FIG. 3, a round of consensus reaching process may be divided into three consensus stages in terms of execution order, to be specific, a proposal stage, a prevote stage, and a precommit stage. A plurality of node devices that participate in a same round of consensus reaching process include a proposal node and a non-proposal node. The proposal node is a node device elected from the plurality of node devices that participate in the consensus reaching. The node device that serves as the proposal node is responsible for generating a block on which consensus reaching is to be performed based on a request in a proposal stage of the current round of consensus reaching process, and broadcasting the block on which consensus reaching is to be performed to other node devices that participate in the consensus reaching for consensus processing. In addition, the node device is responsible for the consensus processing of the block on which consensus reaching is to be performed. The non-proposal node is only responsible for the consensus processing of the block on which consensus reaching is to be performed.

The consensus processing includes prevote processing and precommit processing. The prevote processing occurs in the prevote stage, and the precommit processing occurs in the precommit stage. The prevote processing is a process of determining whether to agree to perform prevote on the block on which consensus reaching is to be performed. If it is agreed to perform prevote on the block on which consensus reaching is to be performed, it is agreed to add the block to the blockchain. The precommit processing is a process of determining whether to agree to perform precommit on the block on which consensus reaching is to be performed. If it is agreed to perform precommit on the block on which consensus reaching is to be performed, it is agreed to add the block to the blockchain. In a plurality of rounds of consensus reaching processes at a same block height, node devices that participate in the consensus reaching may change in different rounds of consensus reaching processes. In other words, in each round, the node devices that participate in the consensus reaching process may change, a proposal node may change, and a block on which consensus reaching is to be performed may change.

Figures 4, 5:
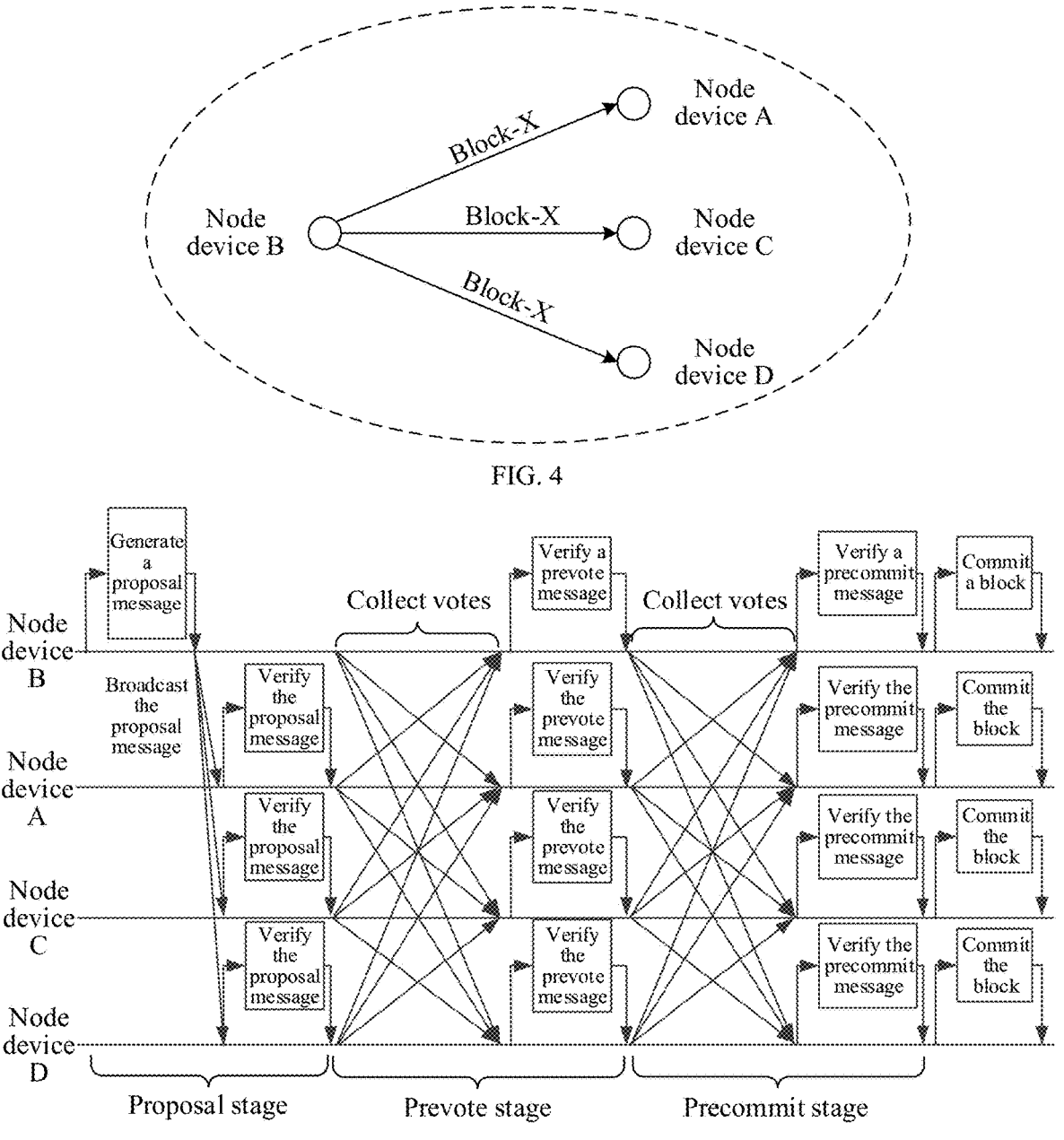
FIG. 4 is a schematic diagram of broadcasting a block by a consensus node according to an embodiment of the present disclosure.
FIG. 5 is a schematic diagram of processing of various consensus stages of a consensus algorithm.

A specific procedure of an $(N-i)^{th}$ round of consensus reaching process at a block height H of the blockchain in the embodiments of the present disclosure is described in detail below by using a specific example. H, N, and i are all positive integers, and i is less than N. For example, i=1. A total of 4 node devices participate in the $(N-1)^{th}$ round of consensus reaching process at the block height H of the blockchain. FIG. 4 is a schematic diagram of broadcasting a block by a consensus node according to an embodiment of the present disclosure. As shown in FIG. 4, a node device A, a node device B, a node device C, and a node device D participate in the consensus reaching process in the blockchain system. In the $(N-1)^{th}$ round of consensus reaching process at the block height H of the blockchain, the node device B is a proposal node, and the node device A, the node device C, and the node device D are non-proposal nodes. As shown in FIG. 5, the specific procedure of the $(N-1)^{th}$ round of consensus reaching process at the block height H of the blockchain includes the following.

I. Proposal Stage:

First, the node device B (that is, the proposal node) generates a target block Block-X on which consensus reaching is to be performed. The Block-X may be a new block created by the node device B. Then, the node device B generates a proposal message for the target block Block-X and broadcasts the proposal message to the node device A, the node device C, and the node device D.

II. Prevote Stage:

Due to a network failure, a device failure, or other reasons, a case that some node devices cannot receive the Block-X broadcast by the node device B within a first time may exist. For example, the node device A does not receive the Block-X broadcast by the node device B within the first time, and the node device C and the node device D receive the Block-X broadcast by the node device B within the first time. Therefore, in the prevote stage, the node device B, the node device C, and the node device D treat the Block-X as the target block on which consensus reaching is to be performed, and perform prevote processing on the Block-X to obtain respective prevote messages. The prevote messages include an identifier of the block on which the prevote processing is performed. For example, the node device C performs prevote processing on the Block-X to generate the prevote message for the node device C. The prevote message for the node device C includes an identifier of the Block-X. The prevote message indicates that the node device C agrees to perform prevote on the Block-X, that is, agrees to add the Block-X to the blockchain. The Block-X obtains a prevote of the node device C.

If the node device C does not generate the prevote message for the node device C, it means that the node device C does not perform prevote processing on the Block-X. If the prevote message of the node device C does not include the identifier of the Block-X, it means that the node device C does not agree to perform prevote on the Block-X, that is, does not agree to add the Block-X to the blockchain. Since the node device A does not receive the Block-X within the first time, the node device A may treat an empty block as the target block on which consensus reaching is to be performed, and perform prevote processing on the empty block to obtain the prevote message of the node device A. The prevote message of the node device A includes an identifier of the empty block. The first time may be set based on an actual requirement, for example, may be set to 30 seconds, 1 minute, or 3 minutes.

The node device A, the node device B, the node device C, and the node device D broadcast the respective prevote messages. Due to a network failure, a device failure, or other reasons, a case that some node devices do not receive the prevote messages broadcast by other node devices within a second time may exist. When the second time arrives, each node device that participates in the consensus reaching process counts a quantity of prevotes obtained by the target block on which consensus reaching is to be performed in the prevote stage based on the prevote messages received within the second time, and determines whether the quantity of the prevotes exceeds a quantity threshold (a quorum). The quantity threshold may be set based on an actual condition. For example, the quantity threshold may be 50% of the quantity of the node devices that participate in the consensus reaching process, or may be 2/3 (or 2/3+1) of the quantity of the node devices that participate in the consensus reaching process. In other embodiments, assuming that a total quantity of the consensus nodes is N and that a quantity of Byzantine nodes (that is, malicious nodes) that may be tolerated is f, the total quantity N of the consensus nodes needs to satisfy N≥3f+1, and the quorum needs to satisfy quorum ≥2f+1. In some embodiments, the second time may be set based on an actual requirement, for example, may be set to 30 seconds, 1 minute, or 3 minutes. The second time may be the same as the first time, or may be different from the first time.

For example, it is assumed that the quantity threshold is set to 2. Since the node device A performs the prevote processing on only the empty block, the prevote message of the node device A includes the identifier of the empty block. Since the node device B, the node device C, and the node device D all perform the prevote processing on the Block-X, the prevote messages of the node device B, the node device C, and the node device D include the identifier of the Block-X. In addition, it is assumed that the node device A receives only the prevote messages from the node device B. In this case, the node device A determines that the quantity of the prevotes obtained by the Block-X does not exceed the quantity threshold of 2 based on a fact that the quantity of the prevotes obtained by the Block-X in the prevote stage counted based on the prevote messages of the node device A is 1. It is assumed that the node device B receives three prevote messages from the node device A, the node device C, and the node device D. In this case, the node device B determines that the quantity of the prevotes obtained by the Block-X exceeds the quantity threshold of 2 based on a fact that the quantity of the prevotes obtained by the Block-X counted based on the prevote messages of the node device B is 3. Similarly, it is assumed that the node device C receives three prevote messages from the node device A, the node device B, and the node device D. In this case, the node device C determines that the quantity of the prevotes obtained by the Block-X exceeds the quantity threshold of 2 based on v the quantity of the prevotes obtained by the Block-X counted based on the prevote messages of the node device C is 3. It is assumed that the node device D receives three prevote messages from the node device A, the node device B, and the node device C. In this case, the node device D determines that the quantity of the prevotes obtained by the Block-X exceeds the quantity threshold of 2 based on a fact that the quantity of the prevotes obtained by the Block-X counted based on the prevote messages of the node device D is 3.

III. Precommit Stage

The node device B, the node device C, and the node device D treat the Block-X as the target block on which consensus reaching is to be performed. Therefore, the devices perform precommit processing on the Block-X to obtain respective precommit voting messages. The precommit voting messages include an identifier of the block on which the precommit processing is performed. For example, the node device C performs the precommit processing on the Block-X to generate the precommit voting message of the node device C. The precommit voting message includes the identifier of the Block-X. The precommit voting message indicates that the node device C agrees to perform precommit on the Block-X, that is, agrees to add the Block-X to the blockchain. The Block-X obtains a precommit of the node device C.

If the node device C does not generate the precommit voting message of the node device C, it means that the node device C does not perform the precommit processing on the Block-X. If the precommit voting message of the node device C does not include the identifier of the Block-X, it means that the node device C does not agree to perform precommit on the Block-X, that is, does not agree to add the Block-X to the blockchain. Since the node device A treats the empty block as the target block on which consensus reaching is to be performed, the node device A performs precommit processing on the empty block to obtain the precommit voting messages of the node device A. The precommit voting message of the node device A includes the identifier of the empty block.

The node device A, the node device B, the node device C, and the node device D broadcast the respective precommit voting messages. Due to a network failure, a device failure, or other reasons, a case that some node devices may not receive the precommit voting message broadcast by other node devices within a third time may exist. When the third time arrives, each node device that participates in the consensus reaching process counts a quantity of precommits obtained by the target block on which consensus reaching is to be performed in the precommit stage based on the precommit voting messages received within the third time, and determine whether the quantity of the precommits exceeds a commit threshold. The commit threshold may be set based on an actual condition. For example, the commit threshold may be 50% of the quantity of the node devices that participate in the consensus reaching process, or may be 2/3 (or 2/3+1) of the quantity of the node devices that participate in the consensus reaching process, or may be 2f+1 described above. The third time may be set based on an actual requirement, for example, may be set to 30 seconds, 1 minute, or 3 minutes. The third time may be the same as the second time, or may be different from the second time. Similarly, the third time may be the same as the first time, or may be different from the first time.

For example, it is assumed that the commit threshold is set to 2. Since the node device A performs the precommit processing on only the empty block, the precommit voting message of the node device A includes the identifier of the empty block. Since the node device B, the node device C, and the node device D all perform the precommit processing on the Block-X, the precommit voting messages of the node device B, the node device C, and the node device D include the identifier of the Block-X. In addition, it is assumed that the node device B receives the precommit voting messages from the node device A and the node device C. In this case, the node device B determines that the quantity of the precommits obtained by the Block-X does not exceed (is not greater than) the commit threshold of 2 based on a fact that the quantity of the precommits obtained by the Block-X in the precommit stage counted based on the precommit voting messages of the node device B is 2. It is assumed that the node device C receives the precommit voting messages from the node device A and the node device B. In this case, the node device C determines that the quantity of the precommits obtained by the Block-X does not exceed (is not greater than) the commit threshold of 2 based on a fact that the quantity of the precommits obtained by the Block-X counted based on the precommit voting messages of the node device C is 2. Similarly, it is assumed that the node device A receives three precommit voting messages from the node device B, the node device C, and the node device D. In this case, the node device A determines that the quantity of the precommits obtained by the Block-X exceeds the commit threshold of 2 based on a fact that the quantity of the precommits obtained by the Block-X counted based on the precommit voting messages of the node device A is 3. It is assumed that the node device D receives three precommit voting messages from the node device A, the node device B, and the node device C. In this case, the node device D determines that the quantity of the precommits obtained by the Block-X exceeds the commit threshold of 2 based on a fact that the quantity of the precommits obtained by the Block-X counted based on the precommit voting messages of the node device D is 3.

After the foregoing three consensus stages, if the quantity of the prevotes obtained by the target block on which consensus reaching is to be performed exceeds the quantity threshold and the quantity of the obtained precommits exceeds the commit threshold, a consensus is successfully reached on the target block on which consensus reaching is to be performed, and the target block can be added to the blockchain. In other words, commit processing may be performed. Otherwise, a consensus is not successfully reached, and the target block cannot be added to the block-chain. Based on the foregoing examples, the node device A determines that the quantity of the precommits obtained by the Block-X exceeds the commit threshold, but the quantity of the obtained prevotes does not exceed the quantity threshold, and therefore determines that a consensus is not successfully reached on the Block-X. The node device B determines that the quantity of the prevotes obtained by the Block-X exceeds the quantity threshold, but the quantity of the obtained precommits does not exceed the commit threshold, and therefore determines that a consensus is not successfully reached on the Block-X. The node device C determines that the quantity of the prevotes obtained by the Block-X exceeds the quantity threshold, but the quantity of the obtained precommits does not exceed the commit threshold, and therefore determines that a consensus is not successfully reached on the Block-X. The node device D determines that the quantity of the prevotes obtained by the Block-X exceeds the quantity threshold, and the quantity of the obtained precommits exceeds the commit threshold, and therefore determines that a consensus is successfully reached on the Block-X. The node device D adds the Block-X to a blockchain locally stored in the node device D.

Based on the above, in the $(N-1)^{th}$ round of consensus reaching process at the block height H of the blockchain, the node device A, the node device B, and the node device C neither reach a consensus on the Block-X, nor write the Block-X to respective distributed ledgers (that is, add the Block-X to respective blockchains locally stored). However, the node device D reaches a consensus on the Block-X and writes the Block-X into a distributed ledger thereof. Therefore, the block height of a blockchain locally stored in the node device D changes to H+1. In an $N^{th}$ round of consensus reaching process at the block height H of the blockchain, the node device D no longer participates in the consensus reaching. Instead, the node device A, the node device B, and the node device C participate in the consensus reaching.

In the $N^{th}$ round of consensus reaching process at the block height H of the blockchain, the proposal node may change. For example, in the foregoing examples, the pro-posal node in the $(N-1)^{th}$ round of consensus reaching process at the block height H of the blockchain is the node device B, while the proposal node in the $N^{th}$ round of consensus reaching process at the block height H of the blockchain may change to the node device C. Then the three consensus stages described above are repeated, to complete the $N^{th}$ round of consensus reaching process at the block height H of the blockchain.

It may be learned from the foregoing consensus mecha-nism that, each block needs to go through three stages: the proposal stage, the prevote stage, and the precommit stage. If the proposal node fails, a verification node needs to wait for a fixed time before reaching the prevote stage. As a result, a consensus reaching process consumes overly long time, and consensus performance of the blockchain is affected. Specifically, as shown in FIG. 6, in a new round of consensus reaching process, a node 0, which serves as the proposal node, constructs a block in the proposal stage, and encapsulates the block as a proposal message, and then broadcasts the proposal message to other consensus nodes. The other consensus nodes verify validity of the proposal message and the block. If the verification succeeds, voting is performed on the block in the prevote stage, and a vote may be expressed as a prevote message. After more than a set quantity (that is, a quorum, for example, 2f+1) of prevote messages are received, the precommit stage is started. After the precommit stage is started, voting is further performed on the block, and a vote may be expressed as a precommit message. After more than a set quantity (that is, the quorum) of precommit votes are received, a consensus is reached on the block.

To ensure stable operation of the algorithm, each consen-sus node is equipped with a timer δ in the proposal stage (to enable the node to construct the proposal message on time, δ is usually set to a relatively large value, for example, 30 s or a larger value), which is configured for enabling the proposal node to construct the block and the proposal message. If the other consensus nodes do not receive the proposal message constructed by the proposal node within δ, the other consensus nodes may perform voting on an empty block nilBlock, to ensure that the algorithm can proceed and enter a next round of consensus reaching as soon as possible. In this way, when a node that serves as the proposal node is down, a fixed time of δ is wasted. It is assumed that a total of 4 consensus nodes exist, and each consensus node suc-cessively serves as the proposal node. If one of the consen-sus nodes is down and can neither generate a block nor participate in consensus reaching, a cycle in which the 4 nodes successively generate blocks may have a waste of ¼ of a time of the cycle, which affects system usability and consensus performance.

Based on the above, the technical solutions of the embodi-ments of the present disclosure provide a new consensus solution for a blockchain, to dynamically adjust a waiting time of a consensus node, thereby reducing a consensus time of a block and improving consensus performance of a blockchain.

Implementation details of the technical solutions of the embodiments of the present disclosure are described below in detail.

FIG. 7 is a flowchart of a consensus method for a blockchain according to an embodiment of the present disclosure. The consensus method for a blockchain may be performed by a consensus node. The consensus node may be an electronic device, such as a server or a terminal device. Specifically, referring to FIG. 7, the consensus method for a blockchain includes at least operation S710 to operation S730. A detailed description is as follows:

Operation S710: Obtain, in a consensus reaching process of a block on which consensus reaching is to be performed initiated by a proposal node, prevote messages generated by consensus nodes in a blockchain network.

In this embodiment of the present disclosure, the proposal node is a node device elected from a plurality of consensus nodes that participate in the consensus reaching. The node device that serves as the proposal node is responsible for generating a block on which consensus reaching is to be performed in a proposal stage of the current round of consensus reaching process, and broadcasting the block on which consensus reaching is to be performed to other node devices that participate in the consensus reaching for consensus processing. In addition, the node device is responsible for the consensus processing of the block on which consensus reaching is to be performed. The non-proposal node is only responsible for the consensus processing of the block on which consensus reaching is to be performed.

In some embodiments of the present disclosure, the prevote messages generated by the consensus nodes in the blockchain network may be prevote messages for the block on which consensus reaching is to be performed, or may be prevote messages for an empty block. Specifically, if the consensus nodes receive the proposal message for the block on which consensus reaching is to be performed within a set duration, the prevote messages for the block on which consensus reaching is to be performed are generated and transmitted if verification succeeds. If the consensus nodes do not receive the proposal message for the block on which consensus reaching is to be performed within the set duration, the prevote messages for the empty block are generated and transmitted.

Operation S720: Count a quantity of first prevote messages for the block on which consensus reaching is to be performed based on the obtained prevote messages, the first prevote messages being generated by the consensus nodes within a set duration in response to a proposal message for the block on which consensus reaching is to be performed, the set duration corresponding to the proposal node and being determined based on a block generation duration of the proposal node.

In some embodiments of the present disclosure, after receiving the proposal message for the block on which consensus reaching is to be performed, each consensus node may generate a prevote message for the block on which consensus reaching is to be performed, then broadcast the generated prevote message to the blockchain network, and receive the prevote messages transmitted by the other consensus nodes in the blockchain network.

In some embodiments, the consensus node has a corresponding set duration for each proposal node recorded therein. The set duration recorded for each proposal node may be different or the same. The set duration may be determined based on the block generation duration of the proposal node. For example, the set duration may be 1.5 times the block generation duration, or may be 2 times the block generation duration. More specifically, it is assumed that the block generation duration is 2 seconds. In this case, a set duration for a consensus node 1 (when the consensus node 1 serves as the proposal node) may be 3 seconds, and a set duration for a consensus node 2 (when the consensus node 2 serves the proposal node) may be 4 seconds.

In this embodiment of the present disclosure, a corresponding set duration may be determined based on a block generation duration of each proposal node, so that the set duration corresponding to each proposal node is related to the block generation duration of the proposal node. In this way, the consensus nodes can be prevented from waiting for a long time before entering a prevote stage as a result of setting an excessively large set duration, thereby shortening a duration of the consensus reaching process.

Operation S730: Adjust the set duration corresponding to the proposal node recorded by the consensus nodes based on the quantity of the first prevote messages.

In this embodiment of the present disclosure, the quantity of the first prevote messages determines whether the consensus nodes reach a consensus in the prevote stage, and indirectly indicates whether the set duration is proper. Therefore, the set duration corresponding to the proposal node recorded by the consensus nodes may be adjusted based on the quantity of the first prevote messages. When the quantity of the first prevote messages does not meet a consensus quantity requirement of the prevote stage, the set duration may be properly increased to ensure that the proposal node has an enough time to generate the block and construct the proposal message. When the quantity of the first prevote messages meets the consensus quantity requirement of the prevote stage and the set duration is set to be relatively large, a magnitude of the set duration may be further reduced, thereby shortening a consensus time of a block, and helping improve consensus performance of a blockchain.

In an embodiment of the present disclosure, a specific adjustment process in operation S730 may be: increasing, if the quantity of the first prevote messages (that is, prevote messages for the block on which consensus reaching is to be performed) does not meet the consensus quantity requirement of the prevote stage and a quantity of obtained second prevote messages for the empty block does not meet the consensus quantity requirement, the set duration corresponding to the proposal node recorded by consensus nodes that generate the second prevote messages to a set maximum value.

In this embodiment, if neither the quantity of the prevote messages for the block on which consensus reaching is to be performed nor the quantity of the prevote messages for the empty block meets the consensus quantity requirement, it means that some consensus nodes receive the proposal message within the set duration but some consensus nodes do not receive the proposal message within the set duration. In this case, the set duration corresponding to the proposal node recorded by the consensus nodes that generate the second prevote messages (that is, the consensus nodes that perform voting for the empty block, or the consensus nodes that do not receive the proposal message within the set period) may be increased, to ensure that the consensus nodes can receive a proposal message within the adjusted set duration when the proposal node initiates another proposal.

In some embodiments, the consensus quantity requirement of the prevote stage is the quorum described in the foregoing embodiment, which may be 2/3+1 of the total quantity of the consensus nodes, or may be ⅔ of the total quantity of the consensus nodes, or may be 2f+1.

In some embodiments, when the set duration corresponding to the proposal node recorded by the consensus nodes that generate the second prevote messages (that is, the prevote messages generated for the empty block) is being increased, a set value may be directly increased, for example, increased by 5 seconds or 10 seconds. However, the adjusted set duration needs to be less than or equal to a set maximum value (for example, 30 seconds). Alternatively, the set duration may be increased by a specific value first. If the case that neither the quantity of the first prevote messages nor the quantity of the second prevote messages meets the consensus quantity requirement still exists for another proposal message initiated by the proposal node, the set duration is further increased by another specific value. In other words, the set duration is adjusted based on a specific step size (the step size may be fixed or variable) until the maximum value is reached.

In an embodiment of the present disclosure, the set duration corresponding to the proposal node recorded by the consensus nodes that participate in the consensus reaching process may be reduced if a consensus reaching process re-initiated by the proposal node meets a consensus requirement in the prevote stage after the set duration recorded by the consensus nodes corresponding to the proposal node is increased. Alternatively, the set duration may be controlled to remain unchanged.

In some embodiments, when the set duration corresponding to the proposal node recorded by the consensus nodes that participate in the consensus reaching process is being reduced, the set value may be directly reduced, for example, reduced by 1 second or 2 seconds. However, the adjusted set duration needs to be greater than or equal to the set minimum value (for example, 3 seconds). Alternatively, the set duration may be reduced by a specific value first. If the consensus reaching process re-initiated by the proposal node still meets the consensus requirement in the prevote stage, the set duration is further reduced by another specific value. In other words, the set duration is adjusted based on a specific step size (the step size may be fixed or variable) until the minimum value is reached. The technical solutions in this embodiment can minimize the magnitude of the set duration to shorten the consensus time of a block while ensuring normal progress of the consensus reaching process of the blockchain network.

In an embodiment of the present disclosure, a specific adjustment process in operation S730 may be: increasing, if the quantity of the first prevote messages (that is, prevote messages for the block on which consensus reaching is to be performed) does not meet the consensus quantity requirement of the prevote stage and a quantity of received second prevote messages for the empty block meets the consensus quantity requirement, the set duration corresponding to the proposal node recorded by the consensus nodes that participate in the consensus reaching process to a set maximum value.

In this embodiment, if the quantity of the prevote messages for the block on which consensus reaching is to be performed does not meet the consensus quantity requirement, but the quantity of the prevote messages for the empty block meets the consensus quantity requirement, it means that most of the consensus nodes do not receive the proposal message within the set duration. In this case, the set duration corresponding to the proposal node recorded by the consensus nodes that participate in the consensus reaching may be increased, to ensure that the consensus nodes that participate in the consensus reaching can receive a proposal message within the adjusted set duration when the proposal node initiates another proposal. In other embodiments of the present disclosure, only the set duration corresponding to the proposal node recorded by the consensus nodes that generate the second prevote messages (that is, the consensus nodes that perform voting on the empty block, or the consensus nodes that do not receive the proposal message within the set duration) may be increased.

In some embodiments, the consensus quantity requirement of the prevote stage is the quorum described in the foregoing embodiment, which may be 2/3+1 of the total quantity of the consensus nodes, or may be 2/3 of the total quantity of the consensus nodes, or may be 2f+1.

In some embodiments, when the set duration corresponding to the proposal node recorded by the consensus nodes that participate in the consensus reaching is being increased, the set value may be directly increased, for example, increased by 5 second or 10 seconds. However, the adjusted set duration needs to be less than or equal to the set maximum value (for example, 30 seconds). Alternatively, the set duration may be increased by a specific value first. If the case that the quantity of the first prevote messages does not meet the consensus quantity requirement but the quantity of the second prevote messages meets the consensus quantity requirement still exists for another proposal message initiated by the proposal node, the set duration is further increased by another specific value. In other words, the set duration is adjusted based on a specific step size (the step size may be fixed or variable) until the maximum value is reached.

In an embodiment of the present disclosure, the set duration corresponding to the proposal node recorded by the consensus nodes that participate in the consensus reaching process may be reduced if a consensus reaching process re-initiated by the proposal node meets a consensus requirement in the prevote stage after the set duration recorded by the consensus nodes corresponding to the proposal node is increased. Alternatively, the set duration may be controlled to remain unchanged.

In some embodiments, when the set duration corresponding to the proposal node recorded by the consensus nodes that participate in the consensus reaching process is being reduced, the set value may be directly reduced, for example, reduced by 1 second or 2 seconds. However, the adjusted set duration needs to be greater than or equal to the set minimum value (for example, 3 seconds). Alternatively, the set duration may be reduced by a specific value first. If the consensus reaching process re-initiated by the proposal node still meets the consensus requirement of the prevote stage, the set duration is further reduced by another specific value. In other words, the set duration is adjusted based on a specific step size (the step size may be fixed or variable) until the minimum value is reached. The technical solutions in this embodiment can minimize the magnitude of the set duration to shorten the consensus time of a block while ensuring normal progress of the consensus reaching process of the blockchain network.

In an embodiment of the present disclosure, a specific adjustment process in operation S730 may be: controlling the set duration corresponding to the proposal node recorded by the consensus nodes that participate in the consensus reaching process to remain unchanged or reducing the set duration corresponding to the proposal node recorded by the consensus nodes that participate in the consensus reaching process to a set minimum value if the quantity of the first prevote messages meets the consensus quantity requirement of the prevote stage.

In some embodiments, when the set duration corresponding to the proposal node recorded by the consensus nodes that participate in the consensus reaching process is being reduced, the set value may be directly reduced, for example, reduced by 1 second or 2 seconds. However, the adjusted set duration needs to be greater than or equal to the set minimum value (for example, 3 seconds). Alternatively, the set duration may be reduced by a specific value first. If the consensus reaching process re-initiated by the proposal node still meets the consensus requirement in the prevote stage, the set duration is further reduced by another specific value. In other words, the set duration is adjusted based on a specific step size (the step size may be fixed or variable) until the minimum value is reached. The technical solutions in this embodiment can minimize the magnitude of the set duration to shorten the consensus time of a block while ensuring normal progress of the consensus reaching process of the blockchain network.

The adjustment processes described in the foregoing embodiments of the present disclosure may be implemented separately or in combination, and corresponding adjustment manners may be selected as long as a corresponding condition is met during the adjustment.

Figure 8:
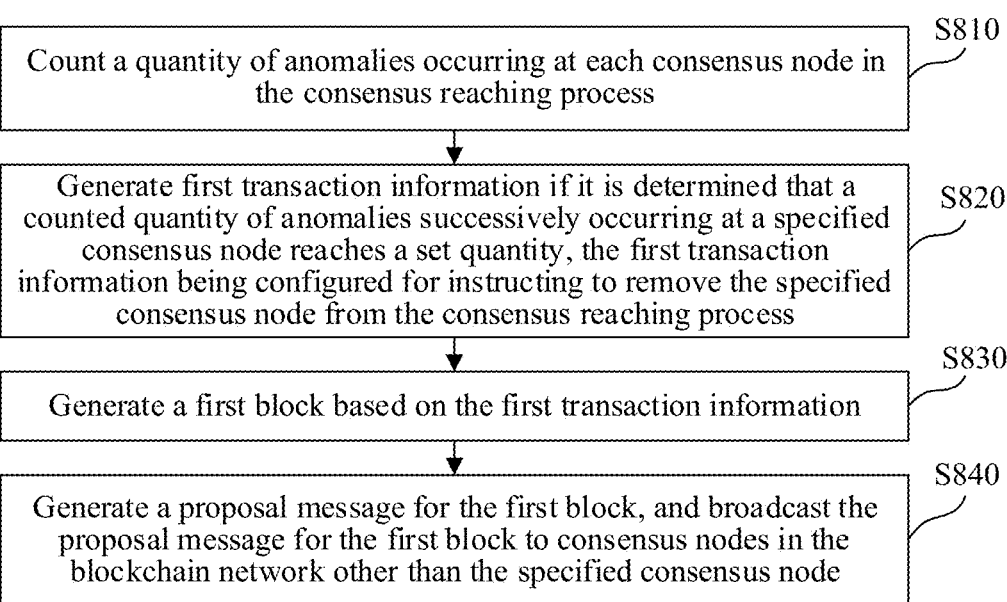
FIG. 8 is a flowchart of a consensus method for a blockchain according to an embodiment of the present disclosure.

FIG. 8 is a flowchart of a consensus method for a blockchain according to an embodiment of the present disclosure. The consensus method for a blockchain may be performed by a consensus node. The consensus node may be an electronic device, such as a server or a terminal device. Specifically, referring to FIG. 8, the consensus method for a blockchain includes at least operation S810 to operation S840. A detailed description is as follows:

Operation S810: Count a quantity of anomalies occurring at each consensus node in the consensus reaching process.

In an embodiment of the present disclosure, an anomaly may occur at a consensus node as a result of a disconnection resulting from a network anomaly or a down time resulting from a system failure, or may occur as a result of a corresponding consensus operation not being performed. For example, the proposal node does not generate a block within the set duration, or does not successfully construct a proposal message.

In some embodiments, a quantity of obtained prevote messages for a proposal block may be counted after each consensus node that serves as the proposal node initiates a proposal message for the proposal block. If the obtained prevote messages for the proposal block do not meet the consensus quantity requirement of the prevote stage, it means that the proposal node may not generate the block within the set duration, or may not successfully construct the proposal message, or may not transmit the proposal message to other consensus nodes due to a network failure. In this case, it may be determined that anomalies occur at the consensus node that initiates the proposal message for the proposal block.

Operation S820: Generate first transaction information if it is determined that a counted quantity of anomalies successively occurring at a specified consensus node reaches a set quantity, the first transaction information being configured for instructing to remove the specified consensus node from the consensus reaching process.

In some embodiments, a consensus node that generates the first transaction information may be a consensus node that serves as the proposal node in a next consensus cycle, or may be other normal consensus nodes in the blockchain network. If the first transaction information is generated by the other consensus nodes, the first transaction information needs to be transmitted to the consensus node that serves as the proposal node in the next consensus cycle.

Operation S830: Generate a first block based on the first transaction information.

In some embodiments, generating the first block based on the first transaction information means packaging the first transaction information to generate the first block.

Operation S840: Generate a proposal message for the first block, and broadcast the proposal message for the first block to consensus nodes in the blockchain network other than the specified consensus node.

In some embodiments, the proposal message for the first block may be different from a normal proposal message, so that the other consensus nodes can learn that the proposal message is configured for removing the specified consensus node from the consensus reaching process after receiving the proposal message. For example, the proposal message for the first block includes type information of the proposal message and identification information of the specified consensus node, the type information of the proposal message being configured as indicating that the proposal message for the first block is configured for instructing to remove the specified consensus nodes from the consensus reaching process.

In an embodiment of the present disclosure, it may be determined that the specified consensus node no longer participates in the consensus reaching process of the blockchain network if a consensus is reached on the first block in the blockchain network.

The technical solution of the embodiment shown in FIG. 8 can remove anomalous consensus nodes from the blockchain network, which avoids a problem that other consensus nodes need to wait for a long time when the anomalous consensus nodes serve as the proposal node, thereby shortening a consensus time of a block.

FIG. 9 is a flowchart of a consensus method for a blockchain according to an embodiment of the present disclosure. The consensus method for a blockchain may be performed by a consensus node. The consensus node may be an electronic device, such as a server or a terminal device. Specifically, referring to FIG. 9, the consensus method for a blockchain includes at least operation S910 to operation S940. A detailed description is as follows:

Operation S910: Count a quantity of anomalies occurring at each consensus node in the consensus reaching process.

In an embodiment of the present disclosure, an anomaly may occur at a consensus node as a result of a disconnection resulting from a network anomaly or a down time resulting from a system failure, or may occur as a result of a corresponding consensus operation not being performed. For example, the proposal node does not generate a block within the set duration, or does not successfully construct a proposal message.

In some embodiments, a quantity of obtained prevote messages for a proposal block may be counted after each consensus node that serves as the proposal node initiates a proposal message for the proposal block. If the obtained prevote messages for the proposal block do not meet the consensus quantity requirement of the prevote stage, it means that the proposal node may not generate the block within the set duration, or may fail to construct the proposal message, or may not transmit the proposal message to other consensus nodes due to a network failure. In this case, it may be determined that anomalies occur at the consensus node that initiates the proposal message for the proposal block.

Operation S920: Generate second transaction information if it is determined that a counted quantity of anomalies successively occurring at a specified consensus node reaches a set quantity, the second transaction information being configured for instructing a candidate node corresponding to the specified consensus node to participate in the consensus reaching process in replacement of the specified consensus node.

In some embodiments, a consensus node that generates the second transaction information may be a consensus node that serves as the proposal node in a next consensus cycle, or may be other normal consensus nodes in the blockchain network. If the second transaction information is generated by the other consensus nodes, the second transaction information needs to be transmitted to the consensus node that serves as the proposal node in the next consensus cycle.

Operation S930: Generate a second block based on the second transaction information.

In some embodiments, generating the second block based on the second transaction information means packaging the second transaction information to generate the second block.

Operation S940: Generate a proposal message for the second block, and broadcast the proposal message for the second block to consensus nodes in the blockchain network other than the specified consensus node and to the candidate node of the specified consensus node.

In some embodiments, the proposal message for the second block may be different from a normal proposal message, so that the other consensus nodes can learn that the proposal message is configured for instructing the candidate node corresponding to the specified consensus node to participate in the consensus reaching process in replacement of the specified consensus node after receiving the proposal message. For example, the proposal message for the second block includes type information of the proposal message and identification information of the candidate node corresponding to the specified consensus node, the type information of the proposal message being configured as indicating that the proposal message for the second block is configured for instructing the candidate node corresponding to the specified consensus node to participate in the consensus reaching process in replacement of the specified consensus node.

A premise for the proposal message for the second block to include the identification information of the candidate node corresponding to the specified consensus node is that the consensus nodes in the blockchain network learns the consensus node corresponding to the candidate node. For example, each consensus node in the blockchain network corresponds to a candidate node, which is recorded by each consensus node. In this case, after the identification information of the candidate node is learned, a consensus node to be replaced can be learned.

In other embodiments of the present disclosure, the proposal message for the second block may not include the identification information of the candidate node corresponding to the specified consensus node, and includes only the identification information of the specified consensus node. In this case, if the consensus nodes in the blockchain network already learn the candidate node corresponding to the consensus node, for example, each consensus node in the blockchain network corresponds to a candidate node, which is recorded by each consensus node, after the identification information of the specified consensus nodes is learned, a corresponding candidate node can be learned.

In addition, the proposal message for the second block may include the identification information of the specified consensus nodes and the identification information of the candidate nodes corresponding to the specified node. Therefore, regardless of whether the consensus nodes in the blockchain network have a correspondence between consensus nodes and candidate nodes recorded therein, a candidate node to replace a consensus node can be learned based on the proposal message for the second block.

In an embodiment of the present disclosure, if a consensus is reached on the second block in the blockchain network, it may be determined that the specified consensus node no longer participates in the consensus reaching process of the blockchain network. In some embodiments, in the prevote stage of the second block in the consensus reaching process, the candidate node also needs to participate in the prevote process. The other consensus nodes in the blockchain network may transmit the prevote messages after receiving the proposal message for the second block and the prevote messages transmitted by the candidate node, which can ensure that the candidate node survives and can be changed to a consensus node.

In an embodiment of the present disclosure, if a consensus is reached on the second block in the blockchain network, the other consensus nodes that participate in the consensus reaching process may transmit precommit voting messages for the second block to the candidate node corresponding to the specified consensus node, so that the candidate node of the specified consensus node participates in the consensus reaching process in replacement of the specified consensus node after the precommit voting messages received by the candidate node meet a consensus quantity requirement of a precommit stage.

In some embodiments, the consensus quantity requirement of the precommit stage may be the quorum described in the foregoing embodiment, which may be 2/3+1 of the total quantity of the consensus nodes, or may be 2/3 of the total quantity of the consensus nodes, or may be 2f+1.

The technical solution of the embodiment shown in FIG. 9 can remove anomalous consensus nodes from the blockchain network while introducing new consensus nodes, which avoids a problem that other consensus nodes need to wait for a long time when the anomalous consensus nodes serve as the proposal node, and can avoid a problem of inaccuracy of a consensus algorithm caused by a decrease in the quantity of consensus nodes in the blockchain network.

The implementation details of the technical solutions of the embodiments of the present disclosure are described again below with reference to FIG. 10 to FIG. 15.

The technical solutions of the embodiments of the present disclosure mainly includes three parts. A first part is a dynamic adjustment mechanism for block generation timeouts of consensus nodes. The mechanism weakens impact on a current round of consensus reaching process when a proposal node fails to generate a block. A second part is a proposal right deprivation algorithm for anomalous consensus nodes. The algorithm fundamentally avoids impact on performance of a consensus reaching process when a consensus node that is actually down and at which successive timeouts occur serves as a proposal node. A last part is a candidate node upgrading algorithm. A configured candidate node is upgraded to a consensus node, to avoid a problem that a total quantity of consensus nodes does not meet a security requirement of the algorithm after a down consensus node is deprived of a proposal right, thereby improving security of a consensus algorithm and system reliability.

In an embodiment of the present disclosure, a main process of the dynamic adjustment mechanism for block generation timeouts of consensus nodes may be shown in FIG. 10. In a new round of stage (that is, when a new round of consensus reaching process is started), each consensus node updates a consensus state thereof to prepare for the current round of consensus reaching, and then each consensus node enters a proposal stage.

In the proposal stage, all consensus nodes start a timer for the current round of proposal stage, and a time of the timer is $\gamma$. $\gamma=\min(\delta, \phi)$. $\delta$ is a relatively large fixed timeout time that is set, for example, may be 30 seconds. $\phi$ is a set duration for the proposal node maintained by each consensus node. For example, the set duration may be twice an actual block generation time of the proposal node (or an average block generation time of a plurality of set consensus cycles). The proposal node constructs a block based on a local transaction, and construct the block and the consensus state in a proposal message. A format of the proposal message may be $<\text{PROPOSAL}, \text{block}, \text{state}, i>\sigma_i$. block represents a proposal block. The proposal block includes a plurality of transactions. state represents the consensus state, and includes information such as a current block height, a current consensus round, and a currently locked block. i represents a serial number of a node that transmits the proposal message. $<>\sigma_i$ represents a signature of the node that transmits the proposal message.

In a prevote stage, after receiving the proposal message transmitted by the proposal node, the consensus node updates a record of a time spent by the proposal node in generating the block. If a consensus node that serves as a verification node does not receive, within a time $\gamma$, the proposal message broadcast by the proposal node, the consensus node directly performs voting on a nilBlock (that is, an empty block) to obtain a prevote message, so as to enter a precommit stage as soon as possible. If the proposal message broadcast by the proposal node is received within the time $\gamma$, voting is performed on the proposal block after verification succeeds, to obtain a prevote message. A format of the prevote message may be <PREVOTE, hash, state, j>$\sigma_j$. hash represents a hash value of the voted block. state represents the consensus state, and includes information such as a current block height, a current consensus round, and a currently locked block. j represents a serial number of a node that transmits the prevote message. $< >\sigma_j$ represents a signature of the node that transmits the prevote message.

In the precommit stage, the consensus node normally performs voting. If voting was performed on a block and prevotes from quorum nodes are received, precommit voting is further performed on the block to obtain a precommit message. If prevotes for a specific block transmitted by the quorum nodes are not obtained, voting is performed on a nilBlock, to obtain a precommit message, so as to complete the current round of consensus reaching and enter a next round of consensus reaching as soon as possible. A format of the precommit message may be <PRECOMMIT, hash, state, j>$\sigma_j$. hash represents a hash value of the voted block. state represents the consensus state, and includes information such as a current block height, a current consensus round, and a currently locked block. j represents a serial number of a node that transmits the precommit message. $< >\sigma_j$ represents a signature of the node that transmits the precommit message.

In the above process, a proposal timeout time set by the consensus node that serves as the verification nodes is $\gamma$, and a time value of $\gamma$ is twice a historical average block generation time of proposal nodes recorded by the verification node. Therefore, in a round, a proposal node that is not down may have a block generation time more than twice the average proposal time considered by some verification nodes. As a result, some nodes may perform voting on a nilBlock before receiving a proposal message, but some verification nodes may actually receive the proposal message and perform voting on a block in the proposal message. An analysis is made below by using 4 consensus nodes as an example, although any number of consensus nodes may be included according to various embodiments of the present disclosure. When 4 consensus nodes are included, there may be three scenarios as shown in FIG. 11 to FIG. 13.

As shown in FIG. 11, a consensus node 3 considers that a consensus node 0 (that is, a proposal node) neither generates a block nor constructs a proposal message within a specified time. In this case, the consensus node directly performs voting on a nilBlock. However, the other three consensus nodes (that is, the consensus node 0, a consensus node 1, and a consensus node 2) receive, within the specified time, a proposal message broadcast by the proposal node. In this case, the three consensus nodes can obtain quorum prevotes on a block in the proposal message, and therefore can reach a consensus in the current round. No security problem exists. In this case, $\phi$ recorded by the consensus node for the proposal node may not be adjusted. Certainly, $\phi$ may be properly reduced, to further shorten a time the consensus nodes need to wait for the proposal node to generate a block and construct a proposal message in the consensus reaching process.

Figure 12:
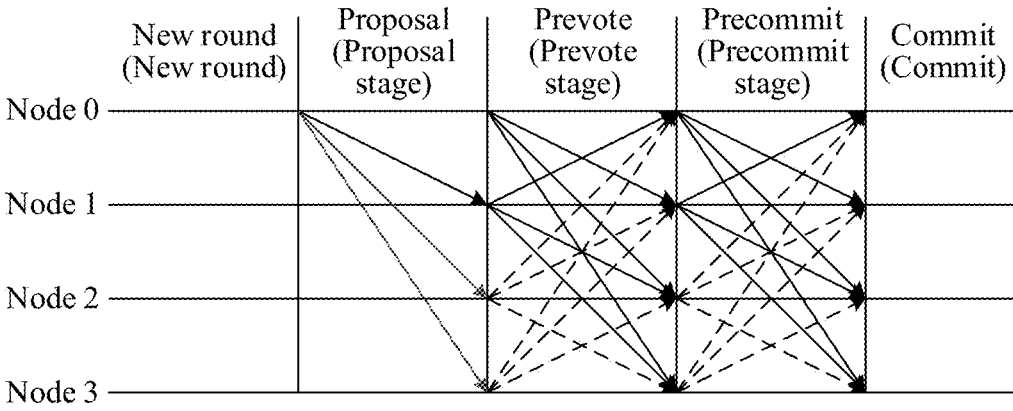
FIG. 12 is a schematic flowchart of a consensus algorithm according to an embodiment of the present disclosure.

As shown in FIG. 12, the consensus node 2 and the consensus node 3 consider that the consensus node 0 (that is, the proposal node) neither generates a block nor constructs a proposal message within a specified time. In this case, the consensus nodes directly perform voting on a nilBlock. However, the other two consensus nodes (that is, the consensus node 0 and the consensus node 1) receive, within the specified time, a proposal message broadcast by the proposal node. In this case, a consensus cannot be reached on either the empty block nilBlcok or an actual block in the proposal message, and a next round of consensus reaching is started. No security problem exists. In this case, a consensus node that does not receive, within the specified time, the proposal message broadcast by the proposal node may set $\phi$ recorded for the proposal node to $\delta$ (which may alternatively be set to a value greater than $\phi$ and less than $\delta$), to prevent the node from successively failing to receive the proposal message as a result of the time $\phi$ being excessively short.

Figure 13:
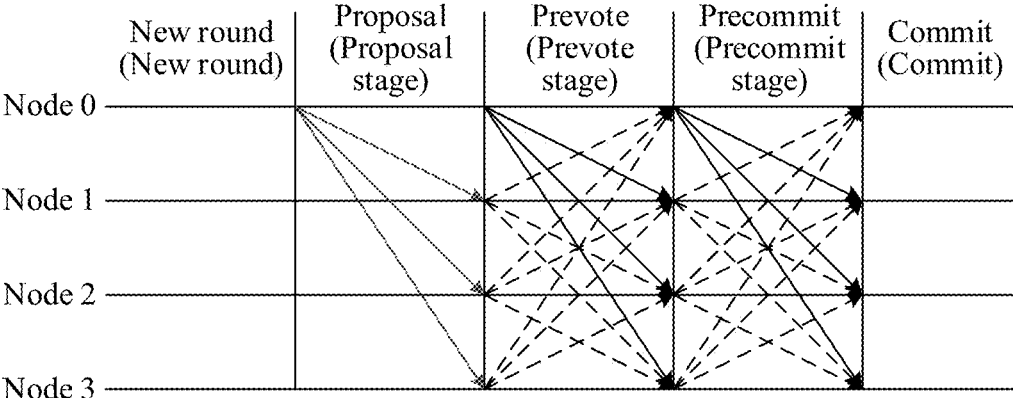
FIG. 13 is a schematic flowchart of a consensus algorithm according to an embodiment of the present disclosure.

As shown in FIG. 13, the consensus node 2, the consensus node 3, and the consensus node 4 consider that the consensus proposal node 0 (that is, the proposal node) neither generates a block nor constructs a proposal message within a specified time. In this case, the consensus nodes directly perform voting on a nilBlock. In this case, the three consensus nodes can obtain quorum prevote votes on the empty block nilBlock, and therefore can reach a consensus in the current round. No security problem exists. In this case, each consensus node may set $\phi$ recorded for the proposal node to $\delta$ (which may alternatively be set to a value greater than $\phi$ and less than $\delta$), to prevent the node from successively failing to receive the proposal message as a result of the time of the time $\phi$ being excessively short. In other embodiments of the present disclosure, the consensus node that does not receive, within the specified time, the proposal message broadcast by the proposal node may set $\phi$ recorded for the proposal node to $\delta$.

In the cases shown in FIG. 12 and FIG. 13, after $\phi$ is increased, if quorum prevotes for a proposal block in a proposal message subsequently re-initiated by the proposal node are received in the prevote stage, $\phi$ may be properly reduced, to shorten a time the consensus nodes need to wait for the proposal node to generate a block and construct a proposal message in the consensus reaching process.

In an embodiment of the present disclosure, the proposal right deprivation algorithm for anomalous consensus nodes mainly includes determining a consensus node as an anomalous consensus node when a quantity of times other consensus nodes locally maintained by the consensus node as the proposal node successively fail to generate a block and/or fail to construct a proposal message reaches a specific threshold $\varphi$ (it is assumed that the threshold is 10). In this case, a current proposal consensus node may initiate a proposal message to deprive a proposal right of the anomalous consensus node, and other consensus nodes may perform consensus reaching. If a consensus is successfully reached, the proposal right of the anomalous consensus algorithm is deprived.

Figure 14:
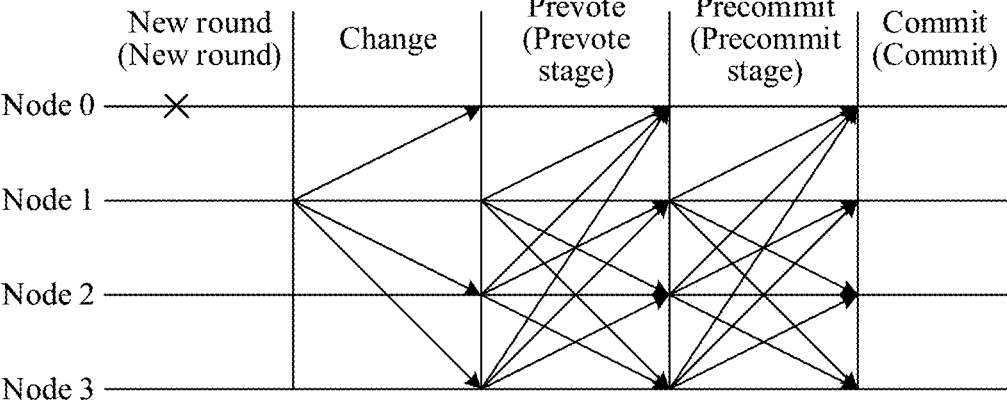
FIG. 14 is a schematic flowchart of a consensus algorithm according to an embodiment of the present disclosure.

Specifically, as shown in FIG. 14, in a new round of stage (that is, when a new round of consensus reaching process is started), each consensus node updates a consensus state thereof, prepares for the current round of consensus reaching, and calculates a quantity of times each of other consensus nodes successively fails to generate a block and/or construct a proposal message. If a consensus node successively fails to generate a block and/or construct a proposal message $\varphi$ times, a change stage is started to execute a proposal right removal algorithm.

In the change stage, it is assumed that the consensus node 1 is the proposal node, and the consensus node 0 successively fails to generate a block and/or construct a proposal message q times. In this case, a transaction of a configuration type is constructed. The transaction is intended to remove the proposal right of the consensus node 0. The transaction is put into a block to construct a special type of proposal message: <CHANGE, block, state, i, k>σ$_j$. block represents the proposal block. The proposal block includes the transaction of the configuration type. state represents the consensus state, and includes information such as a current block height, a current consensus round, and a currently locked block. i represents a serial number of the node (which is the consensus node 1 in this embodiment) that transmits the proposal message. k represents a serial number of the consensus node (which is the consensus node 0 in this embodiment) whose proposal right is to be removed. < >σ$_j$ represents a signature of the node (which is the consensus node 1 in this embodiment) that transmits the proposal message. Subsequently, the change message is broadcast to the other consensus nodes.

In the prevote stage, the other consensus nodes may receive or may not receive the change message. Three cases shown in FIG. 11 to FIG. 13 described above exist. A consensus is reached on the proposal only when all of the other consensus nodes receive the change message and determine that the consensus node 0 successively fails to generate a block and/or construct a proposal message φ times. The other three consensus nodes may not reach a consensus in the current round. In this case, a consensus node does not consider that the consensus node 0 successively fails to generate a block and/or construct a proposal message q times. Nevertheless, if the consensus node 0 is actually down, all of the consensus nodes consider that the consensus node successively fails to generate a block and/or construct a proposal message φ times, and reach a consensus to deprive the proposal right of the anomalous down node.

Same as the foregoing prevote stage, in the precommit stage, the consensus node 0 may be deprived of the proposal right only when the other three consensus nodes reach a consensus.

The proposal right deprivation algorithm for anomalous consensus nodes in this embodiment of the present disclosure can remove anomalous consensus nodes from the blockchain network, which avoids a problem that other consensus nodes need to wait for a long time when the anomalous consensus nodes serve as the proposal node, thereby shortening a consensus time of a block.

In an embodiment of the present disclosure, the candidate node upgrading algorithm is mainly intended to ensure stability and reliability of the blockchain system. During actual deployment, a corresponding candidate node may be arranged for each consensus node. When the consensus node successively fails to generate a block and/or construct a proposal message q times, the candidate node may be upgraded to the consensus node, to maintain the total quantity of consensus nodes N>3f+1, thereby ensuring that a fault tolerance of the algorithm remains unchanged.

Figure 15:
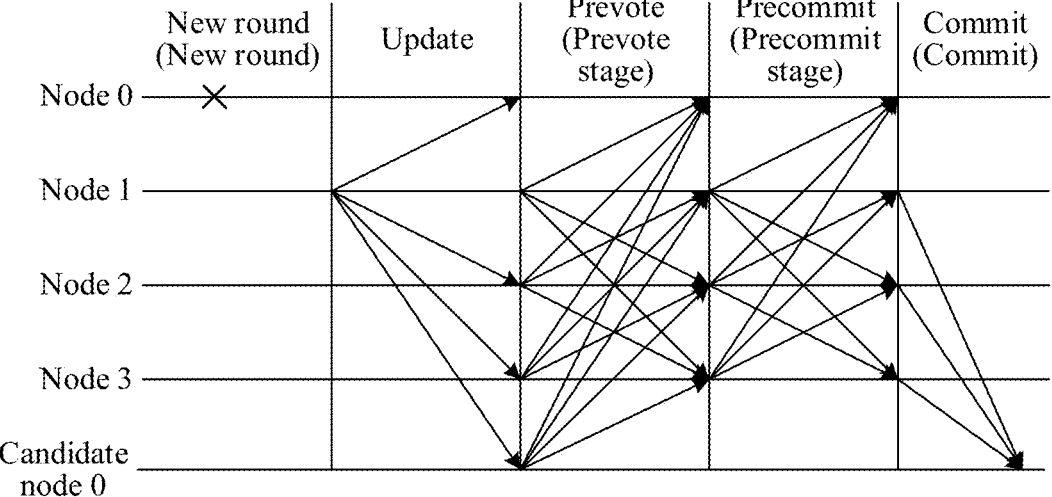
FIG. 15 is a schematic flowchart of a consensus algorithm according to an embodiment of the present disclosure.

Specifically, as shown in FIG. 15, in a new round of stage (that is, when a new round of consensus reaching process is started), each consensus node updates a consensus state thereof, prepares for the current round of consensus reaching, and calculates a quantity of times each of other consensus nodes successively fails to generate a block and/or construct a proposal message. If a consensus node successively fails to generate a block and/or construct a proposal message φ times, and a candidate node for the consensus node exists, an update stage is started to execute the candidate node upgrading algorithm.

In the update stage, it is assumed that the consensus node 1 is the proposal node, and the consensus node 0 successively fails to generate a block and/or construct a proposal message φ times. In this case, a transaction of a configuration type is constructed. The transaction is intended to remove the proposal right of the consensus node 0 and upgrade the candidate node 0 thereof to the consensus node. The transaction is put into a block to construct a special type of proposal message: <UPDATE, block, state, i, k>σ$_i$. block represents the proposal block. The proposal block includes the transaction of the configuration type. state represents the consensus state, and includes information such as a current block height, a current consensus round, and a currently locked block. i represents a serial number of the node (which is the consensus node 1 in this embodiment) that transmits the proposal message. k represents a serial number of the candidate node (that is, the candidate node 0 of the consensus node 0). < >σ$_i$ represents a signature of the node (which is the consensus node 1 in this embodiment) that transmits the proposal message. Subsequently, the update message is broadcast to the other consensus nodes and the candidate node 0.

A premise for the special type of proposal message to include only the serial number of the candidate node is that each consensus node learns the consensus node corresponding to the candidate node. For example, each consensus node corresponds to a candidate node, which is recorded by each consensus node. In this case, after the serial number of the candidate node is learned, a consensus node to be replaced can be learned.

In other embodiments of the present disclosure, the special type of proposal message may not include the serial number of the candidate node, and includes only the serial number of the consensus node whose proposal right needs to be removed. In this case, if the consensus nodes learn the candidate node corresponding to the consensus node, for example, each consensus node corresponds to a candidate node, which is recorded by each consensus node, after the serial number of the consensus node whose proposal right needs to be removed is learned, a corresponding candidate node can be learned.

In addition, the special type of proposal message may include the serial number of the consensus node whose proposal right needs to be removed and the serial number of the corresponding candidate node. Therefore, regardless of whether the consensus nodes in the blockchain network have a correspondence between consensus nodes and candidate nodes recorded therein, a candidate node to replace a consensus node can be learned based on the special type of proposal message.

In the prevote stage, the other consensus nodes may receive or may not receive the update message. A specific situation is the same as the processing of the foregoing the change message, and a consensus can be finally reached. Details are not described herein. The consensus nodes perform voting on the proposal only after receiving the update message and receiving a prevote message broadcast by the candidate node 0, to ensure that the candidate node survives and can be upgraded to the consensus node.

Same as the foregoing prevote stage, in the precommit stage, the consensus node 0 may be deprived of the proposal right only when the other three consensus nodes reach a consensus, and the candidate node 0 is upgraded to the consensus node.

In a commit stage, each consensus node may transmit a precommit message generated by the consensus node to the candidate node 0. After the candidate node 0 receives 2f+1 precommit messages, the candidate node serves as a real consensus node in replacement of the consensus node 0.

The candidate node upgrading algorithm in this embodiment of the present disclosure can remove anomalous consensus nodes from the blockchain network while introducing new consensus nodes, which avoids a problem that other consensus nodes need to wait for a long time when the anomalous consensus nodes serve as the proposal node, and can avoid a problem of inaccuracy of a consensus algorithm caused by a decrease in the quantity of consensus nodes in the blockchain network.

In the technical solutions of the foregoing embodiments of the present disclosure, the dynamic adjustment mechanism for block generation timeouts of consensus nodes, so that a consensus node that serves as the verification node does not need to wait for a fixed long time before performing voting on a nilBlock, and only needs to wait for a short time before performing voting on the block nilBlock, which reduces meaningless waiting due to timeouts and improves consensus efficiency. In addition, the proposal right removal algorithm for anomalous consensus nodes is used. a node which has been down for a long time and at which successive proposal timeouts occur, which can avoid waiting due to successive long timeouts, and improve system usability. After the mechanism of upgrading a candidate node to a consensus node is used, anomalous consensus node can be replaced with candidate nodes that are arranged, which can ensure that a total quantity of nodes that participate in consensus reaching always meets a security requirement and ensure that a fault tolerance of an algorithm is not damaged.

An apparatus embodiment of the present disclosure is described below. The apparatus embodiment may be configured to perform the consensus method for a blockchain in the foregoing embodiments. For details not disclosed in the apparatus embodiment of the present disclosure, reference may be made to the foregoing embodiments of the consensus method for a blockchain of the present disclosure.

Figure 16:
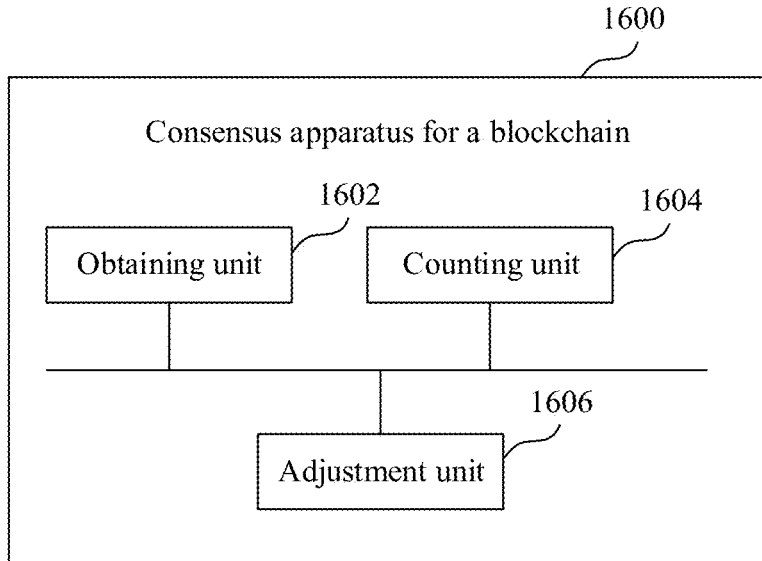
FIG. 16 is a block diagram of a consensus apparatus for a blockchain according to an embodiment of the present disclosure.

FIG. 16 is a block diagram of a consensus apparatus for a blockchain according to an embodiment of the present disclosure. The consensus apparatus for a blockchain may be arranged in a consensus node.

Referring to FIG. 16, a consensus apparatus 1600 for a blockchain in an embodiment of the present disclosure includes an obtaining unit 1602, a counting unit 1604, and an adjustment unit 1606.

The obtaining unit 1602 is configured to obtain, in a consensus reaching process of a block on which consensus reaching is to be performed initiated by a proposal node, prevote messages generated by consensus nodes in a blockchain network. The counting unit 1604 is configured to count a quantity of first prevote messages for the block on which consensus reaching is to be performed based on the obtained prevote messages, the first prevote messages being generated by the consensus nodes within a set duration in response to a proposal message for the block on which consensus reaching is to be performed, the set duration corresponding to the proposal node and being determined based on a block generation duration of the proposal node. The adjustment unit 1606 is configured to adjust the set duration corresponding to the proposal node recorded by the consensus nodes based on the quantity of the first prevote messages.

In some embodiments of the present disclosure, based on the foregoing solutions, the adjustment unit 1606 is configured to increase, if the quantity of the first prevote messages does not meet a consensus quantity requirement of a prevote stage and a quantity of obtained second prevote messages for an empty block does not meet the consensus quantity requirement, the set duration corresponding to the proposal node recorded by consensus nodes that generate the second prevote messages to a set maximum value.

In some embodiments of the present disclosure, based on the foregoing solutions, the adjustment unit 1606 is configured to increase, if the quantity of the first prevote messages does not meet a consensus quantity requirement of a prevote stage and a quantity of obtained second prevote messages for an empty block meets the consensus quantity requirement, the set duration corresponding to the proposal node recorded by consensus nodes that participate in the consensus reaching process to a set maximum value.

In some embodiments of the present disclosure, based on the foregoing solutions, the adjustment unit 1606 is further configured to reduce the set duration corresponding to the proposal node recorded by the consensus nodes that participate in the consensus reaching process if a consensus reaching process re-initiated by the proposal node meets a consensus requirement in the prevote stage after the set duration recorded by the consensus nodes corresponding to the proposal node is increased.

In some embodiments of the present disclosure, based on the foregoing solutions, the adjustment unit 1606 is configured to control the set duration corresponding to the proposal node recorded by the consensus nodes that participate in the consensus reaching process to remain unchanged or reducing the set duration corresponding to the proposal node recorded by the consensus nodes that participate in the consensus reaching process to a set minimum value if the quantity of the first prevote messages meets the consensus quantity requirement of the prevote stage.

In some embodiments of the present disclosure, based on the foregoing solutions, the counting unit 1604 is further configured to count a quantity of anomalies occurring at each consensus node in the consensus reaching process. The consensus apparatus 1600 for a blockchain further includes a generation unit, configured to: generate first transaction information if it is determined that a counted quantity of anomalies successively occurring at a specified consensus node reaches a set quantity, the first transaction information being configured for instructing to remove the specified consensus node from the consensus reaching process; generate a first block based on the first transaction information; and generate a proposal message for the first block, and broadcasting the proposal message for the first block to consensus nodes in the blockchain network other than the specified consensus node.

In some embodiments of the present disclosure, based on the foregoing solutions, the proposal message for the first block includes type information of the proposal message and identification information of the specified consensus node, the type information of the proposal message being configured as indicating that the proposal message for the first block is configured for instructing to remove the specified consensus nodes from the consensus reaching process.

In some embodiments of the present disclosure, based on the foregoing solutions, it is determined that the specified consensus node no longer participates in the consensus reaching process of the blockchain network if a consensus is reached on the first block in the blockchain network.

In some embodiments of the present disclosure, based on the foregoing solutions, the counting unit 1604 is further configured to count a quantity of anomalies occurring at each consensus node in the consensus reaching process. The consensus apparatus 1600 for a blockchain further includes a generation unit, configured to: generate second transaction information if it is determined that a counted quantity of anomalies successively occurring at a specified consensus node reaches a set quantity, the second transaction information being configured for instructing a candidate node corresponding to the specified consensus node to participate in the consensus reaching process in replacement of the specified consensus node; generate a second block based on the second transaction information; and generate a proposal message for the second block, and broadcasting the proposal message for the second block to consensus nodes in the blockchain network other than the specified consensus node and to the candidate node of the specified consensus node.

In some embodiments of the present disclosure, based on the foregoing solutions, the proposal message for the second block includes type information of the proposal message and identification information of the candidate node corresponding to the specified consensus node, the type information of the proposal message being configured as indicating that the proposal message for the second block is configured for instructing the candidate node corresponding to the specified consensus node to participate in the consensus reaching process in replacement of the specified consensus node.

In some embodiments of the present disclosure, based on the foregoing solutions, it is determined that the specified consensus node no longer participates in the consensus reaching process of the blockchain network if a consensus is reached on the second block in the blockchain network. The consensus apparatus 1600 for a blockchain further includes a transmission unit, configured to transmit precommit voting messages for the second block to the candidate node corresponding to the specified consensus node, so that the candidate node participates in the consensus reaching process in replacement of the specified consensus node after the precommit voting messages received by the candidate node meet a consensus quantity requirement of a precommit stage.

In some embodiments of the present disclosure, based on the foregoing solutions, the counting unit 1604 is further configured to count a quantity of obtained prevote messages for a proposal block after the consensus nodes initiate proposal messages for the proposal block as proposal nodes; and determine that the consensus nodes that initiate the proposal messages for the proposal block fail if the obtained prevote messages for the proposal block do not meet the consensus quantity requirement of the prevote stage.

Figure 17:
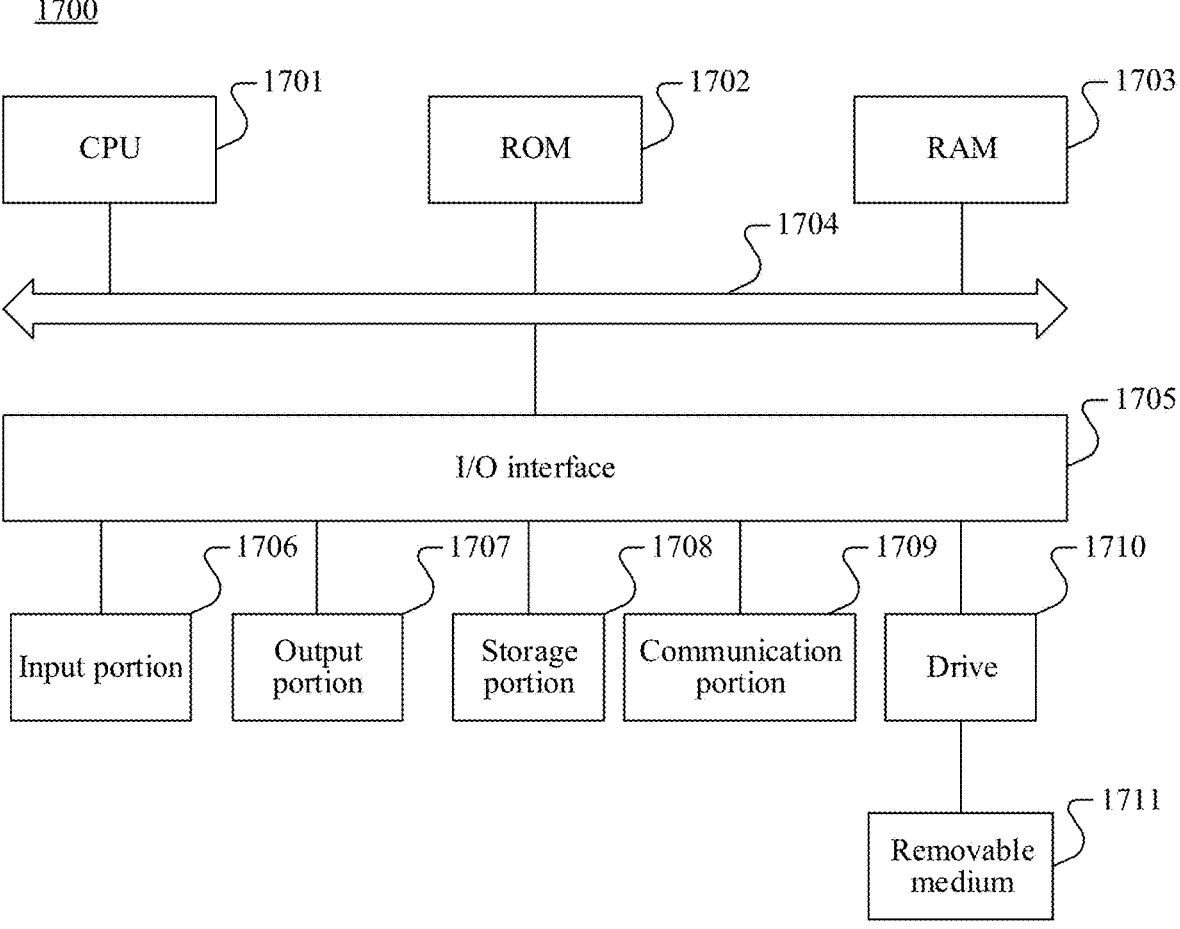
FIG. 17 is a schematic structural diagram of a computer system of an electronic device configured to implement an embodiment of the present disclosure.

FIG. 17 is a schematic structural diagram of a computer system of an electronic device configured to implement an embodiment of the present disclosure.

A computer system 1700 of an electronic device shown in FIG. 17 is merely an example, and does not impose any limitation on a function and use scope of the embodiments of the present disclosure.

As shown in FIG. 17, the computer system 1700 includes a central processing unit (CPU) 1701, which may perform various suitable actions and processing based on a program stored in a read-only memory (ROM) 1702 or a program loaded from a storage portion 1708 into a random access memory (RAM) 1703, for example, perform the method described in the foregoing embodiments. The RAM 1703 further has various programs and data required for system operations stored therein. The CPU 1701, the ROM 1702, and the RAM 1703 are connected to each other through a bus 1704. An input/output (I/O) interface 1705 is also connected to the bus 1704.

The following components are connected to the I/O interface 1705: an input portion 1706 including a keyboard, a mouse, and the like; an output portion 1707 including a cathode ray tube (CRT), a liquid crystal display (LCD), a speaker, and the like; a storage portion 1708 including a hard disk; and a communication portion 1709 including a network interface card such as a local area network (LAN) card and a modem. The communication portion 1709 performs communication by using a network such as the Internet. A drive 1710 is also connected to the I/O interface 1705 as required. A removable medium 1711, such as a magnetic disk, an optical disc, a magneto-optical disk, or a semiconductor memory is installed on the drive 1710 as required, so that a computer program read from the removable medium is installed into the storage portion 1708 as required.

Particularly, according to the embodiments of the present disclosure, the processes described above with reference to the flowcharts may be implemented as a computer software program. For example, an embodiment of the present disclosure includes a computer program product, including a computer program carried in a computer-readable medium. The computer program includes a computer program configured for performing the methods shown in the flowcharts. In such an embodiment, the computer program may be downloaded and installed from a network through the communication portion 1709 and/or installed from the removable medium 1711. When the computer program is executed by the CPU 1701, various functions defined in the system of the present disclosure are executed.

The computer-readable medium shown in this embodiment of the present disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or device, or any combination of the above. A more specific example of the computer-readable storage medium may include but is not limited to an electrical connection having one or more wires, a portable computer disk, a hard disk, a RAM, a ROM, an erasable programmable read-only memory (EPROM), a flash memory, an optical fiber, a compact disc read-only memory (CD-ROM), an optical storage device, a magnetic storage device, or any proper combination thereof. In the present disclosure, the computer-readable storage medium may be any tangible medium having a program included or stored therein. The program may be used by or used in combination with an instruction execution system, apparatus, or device. In the present disclosure, the computer-readable signal medium may include a data signal transmitted in a baseband or as a part of a carrier, and carries a computer-readable computer program. The propagated data signal may have various forms, including but not limited to an electromagnetic signal, an optical signal, or any proper combination thereof. The computer-readable signal medium may alternatively be any computer-readable medium other than a computer-readable storage medium. The computer-readable medium may send, propagate, or transmit the program used by or used in conjunction with the instruction execution system, apparatus, or device. The computer program included in the computer-readable medium may be transmitted by using any proper medium, including but not limited to a wireless medium, a wired medium, or any proper combination thereof.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In another aspect, the present disclosure further provides a computer-readable medium. The computer-readable medium may be included in the electronic device described in the foregoing embodiments, or may exist alone without being installed into the electronic device. The computer-readable medium carries one or more computer programs. The one or more computer programs, when executed by the electronic device, cause the electronic device to implement the methods described in the foregoing embodiments.

As disclosed herein, the first prevote messages are generated by the consensus nodes within the set duration in response to the proposal message for the block on which consensus reaching is to be performed, and the set duration corresponds to the proposal node and is determined based on the block generation duration of the proposal node. Therefore, a relatively short set duration may be set based on the block generation duration of the proposal node, so that the consensus nodes do not need to wait for a long time before entering a prevote stage, thereby shortening a duration of the consensus reaching process. The set duration corresponding to the proposal node recorded by the consensus nodes is adjusted based on the quantity of the first prevote messages, so that when the quantity of the first prevote messages does not meet the consensus quantity requirement of the prevote stage, the set duration may be properly increased to ensure that the proposal node has an enough time to generate a block and construct a proposal message. When the quantity of the first prevote messages meets the consensus quantity requirement of the prevote stage and the set duration is set to be relatively large, a magnitude of the set duration may be further reduced, thereby shortening a consensus time of a block, and helping improve consensus performance of a blockchain.

The present disclosure is not limited to the precise structures described above and shown in the drawings, and various modifications and changes may be made without departing from the scope of the present disclosure. The scope of the present disclosure is subject only to the appended claims.

What is claimed is:

1. A consensus method for a blockchain, performed by an electronic device, the method comprising:
    obtaining, in a consensus reaching process of a block initiated by a proposal node, prevote messages generated by consensus nodes in a blockchain network;
    counting a quantity of first prevote messages for the block based on the obtained prevote messages, the first prevote messages being generated by the consensus nodes within a set duration in response to a proposal message for the block, the set duration corresponding to the proposal node and being determined based on a block generation duration of the proposal node; and
    adjusting the set duration corresponding to the proposal node recorded by the consensus nodes based on the quantity of the first prevote messages, comprising:
        increasing, in response to the quantity of the first prevote messages does not meet a consensus quantity requirement of a prevote stage and a quantity of obtained second prevote messages for an empty block does not meet the consensus quantity requirement, the set duration corresponding to the proposal node recorded by target consensus nodes that generate the second prevote messages to a set maximum value.

2. The method according to claim 1, wherein adjusting the set duration comprises:
    increasing, in response to the quantity of the first prevote messages does not meet the consensus quantity requirement of the prevote stage and the quantity of obtained second prevote messages for the empty block meets the consensus quantity requirement, the set duration corresponding to the proposal node recorded by consensus nodes that participate in the consensus reaching process to the set maximum value.

3. The method according to claim 1, further comprising:
    reducing the set duration corresponding to the proposal node recorded by the consensus nodes that participate in the consensus reaching process in response to that a consensus reaching process re-initiated by the proposal node meets a consensus requirement in the prevote stage after the set duration recorded by the consensus nodes corresponding to the proposal node is increased.

4. The method according to claim 2, further comprising:
    reducing the set duration corresponding to the proposal node recorded by the consensus nodes that participate in the consensus reaching process in response to that a consensus reaching process re-initiated by the proposal node meets a consensus requirement in the prevote stage after the set duration recorded by the consensus nodes corresponding to the proposal node is increased.

5. The method according to claim 1, wherein adjusting the set duration comprises:
    controlling the set duration corresponding to the proposal node recorded by consensus nodes that participate in the consensus reaching process to remain unchanged or reducing the set duration corresponding to the proposal node recorded by the consensus nodes that participate in the consensus reaching process to a set minimum value in response to that the quantity of the first prevote messages meets the consensus quantity requirement of the prevote stage.

6. The method according to claim 1, further comprising:
    counting a quantity of anomalies occurring at a consensus node in the consensus reaching process;
    generating first transaction information in response to determining that a counted quantity of anomalies successively occurring at a specified consensus node reaches a set quantity, the first transaction information being configured for instructing to remove the specified consensus node from the consensus reaching process;
    generating a first block based on the first transaction information; and
    generating a proposal message for the first block, and broadcasting the proposal message for the first block to consensus nodes in the blockchain network other than the specified consensus node.

7. The method according to claim 6, wherein the proposal message for the first block comprises type information of the proposal message and identification information of the specified consensus node, the type information of the proposal message being configured as indicating that the proposal message for the first block is configured for instructing to remove the specified consensus nodes from the consensus reaching process.

8. The method according to claim 6, further comprising:

determining that the specified consensus node no longer participates in the consensus reaching process of the blockchain network in response to that a consensus is reached on the first block in the blockchain network.

9. The method according to claim 1, further comprising:

counting a quantity of anomalies occurring at each consensus node in the consensus reaching process;

generating second transaction information in response to determining that a counted quantity of anomalies successively occurring at a specified consensus node reaches a set quantity, the second transaction information being configured for instructing a candidate node corresponding to the specified consensus node to participate in the consensus reaching process in replacement of the specified consensus node;

generating a second block based on the second transaction information; and generating a proposal message for the second block, and broadcasting the proposal message for the second block to consensus nodes in the blockchain network other than the specified consensus node and to the candidate node of the specified consensus node.

10. The method according to claim 9, wherein the proposal message for the second block comprises type information of the proposal message and identification information of the candidate node corresponding to the specified consensus node, the type information of the proposal message being configured as indicating that the proposal message for the second block is configured for instructing the candidate node corresponding to the specified consensus node to participate in the consensus reaching process in replacement of the specified consensus node.

11. The method according to claim 9, further comprising:

determining that the specified consensus node no longer participates in the consensus reaching process of the blockchain network in response to that a consensus is reached on the second block in the blockchain network; and transmitting precommit voting messages for the second block to the candidate node corresponding to the specified consensus node, so that the candidate node participates in the consensus reaching process in replacement of the specified consensus node after the precommit voting messages received by the candidate node meet a consensus quantity requirement of a precommit stage.

12. The method according to claim 6, further comprising:

counting a quantity of obtained prevote messages for a proposal block after the consensus nodes initiate proposal messages for the proposal block as proposal nodes; and determining that anomalies occur at the consensus nodes that initiate the proposal messages for the proposal block in response to that the obtained prevote messages for the proposal block do not meet the consensus quantity requirement of the prevote stage.

13. An electronic device, comprising:

one or more processors; and a memory, configured to store one or more computer programs that, when being executed, cause the one or more processors to implement:

obtaining, in a consensus reaching process of a block initiated by a proposal node, prevote messages generated by consensus nodes in a blockchain network;

counting a quantity of first prevote messages for the block based on the obtained prevote messages, the first prevote messages being generated by the consensus nodes within a set duration in response to a proposal message for the, the set duration corresponding to the proposal node and being determined based on a block generation duration of the proposal node; and adjusting the set duration corresponding to the proposal node recorded by the consensus nodes based on the quantity of the first prevote messages, comprising:

increasing, in response to the quantity of the first prevote messages does not meet a consensus quantity requirement of a prevote stage and a quantity of obtained second prevote messages for an empty block does not meet the consensus quantity requirement, the set duration corresponding to the proposal node recorded by target consensus nodes that generate the second prevote messages to a set maximum value.

14. The device according to claim 13, wherein the one or more processors are further configured for performing:

increasing, in response to the quantity of the first prevote messages does not meet the consensus quantity requirement of the prevote stage and the quantity of obtained second prevote messages for the empty block meets the consensus quantity requirement, the set duration corresponding to the proposal node recorded by consensus nodes that participate in the consensus reaching process to the set maximum value.

15. The device according to claim 13, wherein the one or more processors are further configured for performing:

reducing the set duration corresponding to the proposal node recorded by the consensus nodes that participate in the consensus reaching process in response to that a consensus reaching process re-initiated by the proposal node meets a consensus requirement in the prevote stage after the set duration recorded by the consensus nodes corresponding to the proposal node is increased.

16. The device according to claim 14, wherein the one or more processors are further configured for performing:

reducing the set duration corresponding to the proposal node recorded by the consensus nodes that participate in the consensus reaching process in response to that a consensus reaching process re-initiated by the proposal node meets a consensus requirement in the prevote stage after the set duration recorded by the consensus nodes corresponding to the proposal node is increased.

17. The device according to claim 13, wherein the one or more processors are further configured for performing:

controlling the set duration corresponding to the proposal node recorded by consensus nodes that participate in the consensus reaching process to remain unchanged or reducing the set duration corresponding to the proposal node recorded by the consensus nodes that participate in the consensus reaching process to a set minimum value in response to that the quantity of the first prevote messages meets the consensus quantity requirement of the prevote stage.

18. A non-transitory computer-readable medium containing a computer program that, when being executed, causes one or more processors to implement:

obtaining, in a consensus reaching process of a block initiated by a proposal node, prevote messages generated by consensus nodes in a blockchain network;

counting a quantity of first prevote messages for the block based on the obtained prevote messages, the first prevote messages being generated by the consensus nodes within a set duration in response to a proposal message for the, the set duration corresponding to the proposal node and being determined based on a block generation duration of the proposal node; and adjusting the set duration corresponding to the proposal node recorded by the consensus nodes based on the quantity of the first prevote messages, comprising:

increasing, in response to the quantity of the first prevote messages does not meet a consensus quantity requirement of a prevote stage and a quantity of obtained second prevote messages for an empty block does not meet the consensus quantity requirement, the set duration corresponding to the proposal node recorded by target consensus nodes that generate the second prevote messages to a set maximum value.

* * * * *